United States Patent
Nam

(10) Patent No.: US 12,493,299 B2
(45) Date of Patent: Dec. 9, 2025

(54) AIR MOBILITY DEVICE AND A METHOD FOR INSPECTING A VEHICLE USING THE AIR MOBILITY DEVICE

(71) Applicants: HYUNDAI MOTOR COMPANY, Seoul (KR); KIA CORPORATION, Seoul (KR)

(72) Inventor: Joo Han Nam, Hwaseong-si (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 117 days.

(21) Appl. No.: 18/540,136

(22) Filed: Dec. 14, 2023

(65) Prior Publication Data

US 2024/0385628 A1 Nov. 21, 2024

(30) Foreign Application Priority Data

May 17, 2023 (KR) .................. 10-2023-0063864

(51) Int. Cl.
| | |
|---|---|
| *G05D 1/225* | (2024.01) |
| *B64U 101/26* | (2023.01) |
| *B64U 101/30* | (2023.01) |
| *G05D 1/689* | (2024.01) |
| *G05D 105/80* | (2024.01) |
| *G05D 107/00* | (2024.01) |

(Continued)

(52) U.S. Cl.
CPC ......... *G05D 1/225* (2024.01); *B64U 2101/26* (2023.01); *B64U 2101/30* (2023.01); *B64U 2201/20* (2023.01); *G05D 1/689* (2024.01); *G05D 2105/89* (2024.01); *G05D 2107/95* (2024.01); *G05D 2109/20* (2024.01); *G05D 2109/254* (2024.01)

(58) Field of Classification Search
None
See application file for complete search history.

(56) References Cited

U.S. PATENT DOCUMENTS 10,102,586 B1 * 10/2018 Marlow ............... G06Q 40/08
11,373,528 B2    6/2022 Obayashi et al.
(Continued)

FOREIGN PATENT DOCUMENTS

| GB | 2552092 A | * | 1/2018 | ......... G01M 11/081 |
| JP | 6753374 B2 | | 8/2020 | |

(Continued)

*Primary Examiner* — Peter D Nolan
*Assistant Examiner* — Michael F Whalen
(74) *Attorney, Agent, or Firm* — Lempia Summerfield Katz LLC

(57) ABSTRACT

An air mobility device includes at least one communication circuit, at least one camera, a microphone, a driving device, a memory, and a processor connected with the at least one communication circuit, the at least one camera, the microphone, the driving device, and the memory. The processor moves to a position adjacent to a vehicle using the driving device. The processor also connects communication with the vehicle using the at least one communication circuit. The processor also transmits a request signal for requesting the vehicle to execute a function to the vehicle through the communication. The processor also inspects the function of the vehicle, using at least one of the at least one camera or the microphone.

19 Claims, 13 Drawing Sheets

(51) Int. Cl.
    *G05D 109/20*     (2024.01)
    *G05D 109/25*     (2024.01)

(56)     References Cited

U.S. PATENT DOCUMENTS

| | | | |
|---|---|---|---|
| 2010/0154550 A1* | 6/2010 | Trader | B61L 23/00 |
| | | | 73/645 |
| 2019/0055015 A1* | 2/2019 | Allard | G05D 1/0038 |
| 2019/0266715 A1* | 8/2019 | Myers | B64U 80/25 |
| 2020/0012281 A1 | 1/2020 | Jaegal | |
| 2020/0017114 A1 | 1/2020 | Santoni et al. | |
| 2020/0160713 A1 | 5/2020 | Obayashi et al. | |
| 2022/0118942 A1 | 4/2022 | Nam et al. | |
| 2022/0348322 A1* | 11/2022 | Zemenchik | B64D 47/00 |
| 2023/0348109 A1* | 11/2023 | Sweers | G08G 5/57 |

FOREIGN PATENT DOCUMENTS

| | | |
|---|---|---|
| KR | 101715300 B1 | 3/2017 |
| KR | 20190095909 A | 8/2019 |
| KR | 102136293 B1 | 7/2020 |
| KR | 20210072225 A | 6/2021 |
| KR | 102293541 B1 | 8/2021 |
| KR | 20220051675 A | 4/2022 |
| KR | 20230001064 A | 1/2023 |

\* cited by examiner

AIR MOBILITY DEVICE AND A METHOD FOR INSPECTING A VEHICLE USING THE AIR MOBILITY DEVICE

CROSS-REFERENCE TO RELATED APPLICATION

This application claims the benefit of and the priority to Korean Patent Application No. 10-2023-0063864, filed in the Korean Intellectual Property Office on May 17, 2023, the entire contents of which are incorporated herein by reference.

TECHNICAL FIELD

The present disclosure relates to an air mobility device and a method for inspecting a vehicle using an air mobility device.

BACKGROUND

Recently, an automatic hub-to-hub delivery system aiming for green logistics has been proposed. The automatic hub-to-hub delivery system may automate the hub-to-hub transportation of logistics in an eco-friendly way using an automated guided vehicle. The automatic hub-to-hub delivery system may also alleviate road congestion by reducing the transportation share of trucks. automatic hub-to-hub delivery system may also supplement the accessibility problem of rail transportation. For example, Korean Patent Laid-open Publication No. 10-2022-0051675 discloses a tractor-trailer management system in an autonomous truck.

Meanwhile, today, the utilization of an unmanned air mobility device (UAV) (e.g., a drone) has expanded to various fields. For example, in the private sector, drones may be used for broadcast filming or entertainment. In addition, the drones may be used in a logistics service field and various fields. For example, the drones are used in various fields, such as information collection, rescue of people, rescue, transfer, transportation, monitoring, reporting, inspection, firefighting, quarantine, and/or pesticide spraying.

The above-mentioned information may be provided to help understanding of the present disclosure. The above-mentioned contents in conjunction with the present disclosure should not be determined as prior art.

SUMMARY

The present disclosure has been made to solve the above-mentioned problems occurring in the prior art while advantages achieved by the prior art are maintained intact.

An aspect of the present disclosure provides an air mobility device and a method for inspecting a vehicle to prevent a human error by inspecting the vehicle. The method may use the air mobility device rather than a person who directly inspects the vehicle. Another aspect of the present disclosure provides an air mobility device and a method for inspecting a vehicle to enhance diagnosis precision. The air mobility device and the method may use previous record data of the vehicle by means of a control server connected with a drone.

According to an aspect of the present disclosure, an air mobility device may include at least one communication circuit, at least one camera, a microphone, a driving device, a memory, and a processor connected with the at least one communication circuit, the at least one camera, the microphone, the driving device, and the memory. The processor may be configured to move to a position adjacent to a vehicle using the driving device. The processor may be also configured to connect communication with the vehicle using the at least one communication circuit. The processor may be configured to transmit a request signal for requesting the vehicle to execute a function to the vehicle through the communication. The processor may be configured to inspect the function of the vehicle, using at least one of the at least one camera or the microphone.

According to another aspect of the present disclosure, a method for inspecting a vehicle using an air mobility device may include moving the air mobility device to a position adjacent to the vehicle using a driving device of the air mobility device. The method may also include connecting the air mobility device with the vehicle through communication. The method may also include transmitting a request signal for requesting the vehicle to execute a function through the communication. The method may also include inspecting the function of the vehicle, using at least one of at least one camera or a microphone included in the air mobility device.

BRIEF DESCRIPTION OF THE DRAWINGS

The above and other objects, features, and advantages of the present disclosure should be more apparent from the following detailed description taken in conjunction with the accompanying drawings.

Figure 1:
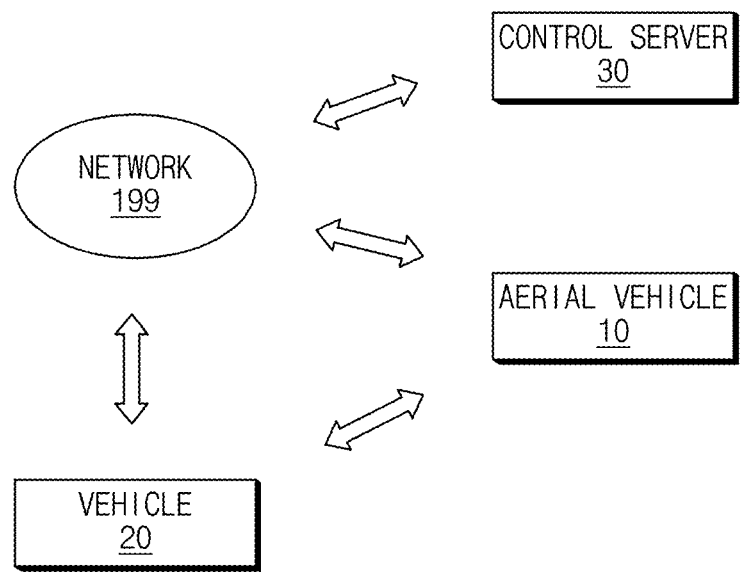
FIG. 1 illustrates a vehicle inspection system according to an embodiment.

With regard to description of drawings, the same or similar denotations may be used for the same or similar components.

DETAILED DESCRIPTION

Hereinafter, various embodiments of the present disclosure are described with reference to accompanying drawings. However, it should be understood that this is not intended to limit the disclosure to specific implementation forms and includes various modifications, equivalents, and/or alternatives of embodiments of the disclosure.

In the disclosure, the expressions "have", "may have", "include", "comprise", "may include", and "may comprise" used herein indicate existence of corresponding features (e.g., components such as numeric values, functions, operations, or parts). However, the expressions do not exclude presence of additional features.

In the disclosure, the expressions "A or B", "at least one of A or/and B", or "one or more of A or/and B", and the like may include any and all combinations of the associated listed items. For example, the term "A or B", "at least one of A and B", or "at least one of A or B" may refer to all of (1) the case where at least one A is included, (2) the case where at least one B is included, and (3) the case where both of at least one A and at least one B are included.

The terms, such as "first", "second", "1st", "2nd", or the like used in the disclosure may be used to refer to various components regardless of the order and/or the priority and to distinguish the relevant components from other components. However, the terms do not limit the components. For example, without departing the scope of the disclosure, a first component may be referred to as a second component, and similarly, a second component may be referred to as a first component.

It should be understood that when an element (e.g., a first element) is referred to as being "(operatively or communicatively) coupled with/to" or "connected to" another element (e.g., a second element), it can be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there is no intervening element (e.g., a third element).

According to the situation, the expression "configured to" used in the present disclosure may be used interchangeably with, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other components. For example, a "processor configured to perform A, B, and C" may mean a generic-purpose or a specific-purpose processor (e.g., a central processing unit (CPU) or an application processor). The processor may perform corresponding operations by executing one or more software programs, which stores a dedicated processor (e.g., an embedded processor) for performing a corresponding operation.

Terms used in the present disclosure are used to describe specified embodiments and are not intended to limit the scope of another embodiment. The terms of a singular form may include plural forms unless the context clearly indicates otherwise. All the terms used herein, which include technical or scientific terms, may have the same meaning that is generally understood by a person having ordinary skill in the art described in the present disclosure. It should be further understood that terms, which are defined in a dictionary and commonly used, should also be interpreted as is customary in the relevant related art and not in an idealized or overly formal detect unless expressly so defined herein in various embodiments of the disclosure. In some cases, even though terms are terms, which are defined in the present disclosure, the terms should not be interpreted to exclude embodiments of the present disclosure.

Hereinafter, an embodiment of the present disclosure is described in detail with reference to the accompanying drawings. When a component, device, element, or the like of the present disclosure is described as having a purpose or performing an operation, function, or the like, the component, device, element, or the like should be considered herein as being "configured to" meet that purpose or to perform that operation or function. Each of the component, device, element, and the like may separately embody or be included with a processor and a memory, such as a non-transitory computer readable media, as part of the apparatus.

FIG. 1 is a drawing schematically illustrating a system for performing a vehicle inspection method using an air mobility device according to an embodiment.

Referring to FIG. 1, the system for performing the vehicle inspection method using an air mobility device according to an embodiment of the present disclosure may include an air mobility device (e.g., an aerial vehicle) 10, a vehicle 20, a control server 30, and a network 199.

In the present disclosure, the air mobility device 10 may include a f fixed-wing aircraft (e.g., an airplane, an ultralight aircraft, or an unmanned air mobility device), a rotary-wing aircraft (e.g., a helicopter), an individual propelled aircraft (e.g., a rocket), a multi-wing aircraft (e.g., a drone), and/or a fixed-wing and rotary-wing combination aircraft (e.g., a vertical takeoff and landing aircraft). The fixed-wing aircraft may be composed of fixed wings and a body and may refer to an air mobility device, which flies in the air using the lift generated by its wings. The rotary-wing aircraft may refer to an air mobility device, which flies in the air by rotating its wings. The individual propelled aircraft may refer to an air mobility device, which has propulsion systems configured to separately operate and independently operate the respective propulsion systems to facilitate a flight. The multi-wing aircraft may refer to an air mobility device in the form of having several wings and dispersing flight power. The fixed-wing and rotary-wing combination aircraft may refer to an air mobility device capable of combining fixed-wing and rotary-wing advantages to perform various flight operations.

In an embodiment, the air mobility device 10 may transmit and receive information with the control server 30 over the network 199 and may be connected with the vehicle 20 through short-range communication. For example, the air mobility device 10 may use information provided by the control server 30 to inspect the vehicle 20.

In the present disclosure, the vehicle 20 may include an autonomous vehicle, a car (e.g., a compact car, a mid-size car, or a large car), a sport utility vehicle (SUV) (e.g., a compact SUV, a mid-size SUV, or a large SUV), a pickup truck, a minivan, a sports car, a coupe, a convertible (e.g., an open car), a sedan, a hybrid (e.g., electricity and fuel cell or electricity and gasoline) car, an electric vehicle, a hydrogen vehicle, an off-road vehicle (e.g., a jeep or an all-terrain vehicle (ATV)), a supercar, a classic car, a vintage car, a van (e.g., a bus, a minibus, or the like), a special vehicle (e.g., a freight truck or a crane truck), a military vehicle (e.g., a combat vehicle, an armored vehicle, or a military truck), a special car (e.g., a fire truck, an ambulance, a police car, or the like), a tuning car (e.g., a modified vehicle), and/or other vehicles (e.g., a buggy, an electric kickboard, or an electric bicycle). In addition, new forms and types of vehicles may be continuously included. Furthermore, various types of vehicles, each of which has the same function according to a region or country, a purpose of a vehicle, a design of the vehicle, or the like, may be included.

In an embodiment, the vehicle 20 may transmit and receive information with the control server 30 over the network 199 and may be connected with the air mobility device 10 through short-range communication.

In the present disclosure, the control server 30 may control or store information. The control server 30 may transmit and receive information to share the information with the air mobility device 10 and the vehicle 20. The control server 30 may communicate with an external server to exchange information with the external server. For example, the external server may be, but is not limited to, a storage server which is separately provided outside the control server 30.

In an embodiment, the external server may be connected with the control server 30 over the network 199. The external server may provide information necessary for the control server 30 to inspect the vehicle 20. The external server may receive and store or manage information from the air mobility device 10 or the vehicle 20.

Furthermore, the control server 30 may store any information data in a database, a computer-readable medium, or the like. The computer-readable medium may include a computer-readable storage medium and a computer-readable communication medium. Such a computer-readable storage medium may include any type of storage medium which stores a program and data to be readable by a computer system. In an embodiment, the computer-readable storage medium may include at least one of a read only memory (ROM), a random access memory (RAM), a compact-disc (CD)-ROM, a digital video disc (DVD)-ROM, a magnetic tape, a floppy disk, or an optical data storage device. Furthermore, the computer-readable communication medium may include a medium implemented in the form of a carrier wave (e.g., transmission through the Internet). In addition, the computer-readable communication medium may store codes and/or commands, which are distributed in a system connected with a network and are readable by a computer in a distribution scheme.

In an embodiment, the control server 30 may connect wireless communication with the air mobility device 10 and/or the vehicle 20 over the network 199. The control server 30 may receive a vehicle inspection request signal from the vehicle 20 over the network 199. The control server 30 may manage a plurality of air mobility devices including the air mobility device 10. The control server 30 may control movement of the plurality of air mobility devices including the air mobility device 10. The control server 30 may determine an optimal air mobility device for inspecting the vehicle 20 among the plurality of air mobility devices including the air mobility device 10. For example, the control server 30 may determine an optimal air mobility device, which is closest to the vehicle 20 among the plurality of air mobility devices including the air mobility device 10 based on position information of the vehicle 20. The position information is described below in conjunction with information about the vehicle 20 in FIG. 2. The control server 30 may transmit an inspection command signal for the vehicle 20 to the air mobility device 10 over the network 199. The control server 30 may receive an inspection record for the vehicle 20 from the air mobility device 10 and may inspect the vehicle 20.

The network 199 may refer to a connection structure capable of exchanging information between respective nodes such as a plurality of electronic devices and servers. For example, the network 199 may include a local area network (LAN), a wide area network (WAN), the Internet, a wired and wireless data communication network, a telephone network, a wired and wireless television communication network, and/or the like.

The wireless data communication network may include, but is not limited to, a cellular network, a world interoperability for microwave access (WIMAX) network, a wireless-fidelity (Wi-Fi) network, the Internet, a local area network (LAN), a wireless LAN (WLAN), a wide area network (WAN), a personal area network (PAN), a radio frequency (RF)-based network, a Bluetooth network, a near-field communication (NFC) network, a satellite broadcasting network, an analog broadcasting network, a digital multimedia broadcasting (DMB) network, and/or the like.

Figure 2:
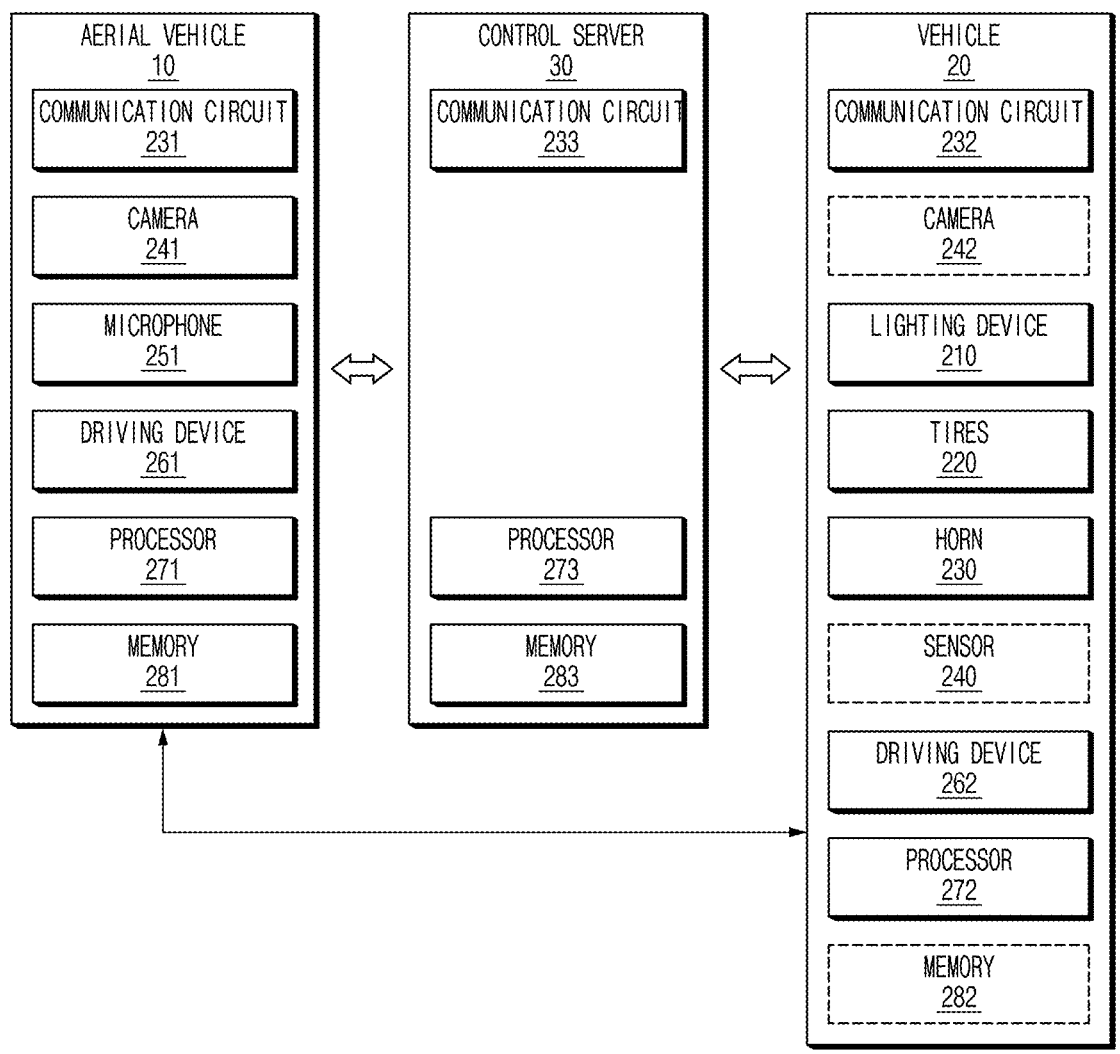
FIG. 2 is a block diagram of an air mobility device, a vehicle, and a control server according to an embodiment.

FIG. 2 is a block diagram of an air mobility device, a vehicle, and a control server according to an embodiment.

Referring to FIG. 2, an air mobility device 10 may include a communication circuit 231, a camera 241, a microphone 251, a driving device 261, a processor 271, and/or a memory 281.

The processor 271 may be connected with the communication circuit 231, the camera 241, the microphone 251, the driving device 261, and/or the memory 281. For example, the processor 271 may be electrically connected with the components of the air mobility device 10. For example, the processor 271 may be connected with the components of the air mobility device 10 in a wired or wireless manner. The processor 271 may be composed of a single chip or a plurality of chips. The processor 271 may include at least one processing circuitry. The processor 271 may perform calculation necessary for an operation of the air mobility device 10. The processor 271 may control the components of the air mobility device 10. In the present disclosure, the operation of the air mobility device 10 may be referred to as being performed by the processor 271.

According to an embodiment, the processor 271 may control the air mobility device 10 to inspect the vehicle 20. The processor 271 may receive information about the vehicle 20 from the control server 30 using the communication circuit 231. For example, the information may include position information and/or identification information about the vehicle 20. In an embodiment, information used to identify a position may include at least one of global positioning system (GPS) information for identifying a position using a satellite signal, Wi-Fi signal information for identifying a position using a signal of a Wi-Fi hotspot, Bluetooth signal information for identifying a position using a signal of a device which uses Bluetooth, cellular network information for identifying a position using a cellular network, or IP address information for identifying a position using an IP address of a device connected with the Internet. Information used to identify the vehicle 20 may include at least one of a vehicle identification number, a vehicle registration number, an engine number, a manufacturer and model name, a color of the vehicle 20, or a size and form of the vehicle 20. The processor 271 may move the air mobility device 10 to a position adjacent to the vehicle 20 using the driving device 261. The processor 271 may connect short-range communication with the vehicle 20 using the communication circuit 231. The processor 271 may receive a command to inspect the vehicle 20 from the control server 30 using the communication circuit 231. The processor 271 may transmit a signal for requesting the vehicle 20 to execute a function to the vehicle 20 using the communication circuit 231. The processor 271 may inspect the vehicle 20 using at least one sensor (e.g., the camera 241 and/or the microphone 251). The processor 271 may transmit an inspection record of the vehicle 20 to the control server 30 using the communication circuit 231. The inspection of the vehicle 20 using the processor 271 is described with reference to FIGS. 4A-10.

The memory 281 may store various pieces of information necessary for an operation of the electronic device 10. In an embodiment, the memory 281 may store information about the vehicle 20, which is received from the control server 30. For example, the memory 281 may store position information and/or identification information of the vehicle 20. The memory 281 may store a command signal for the vehicle 20, which is received from the control server 30. For example, the memory 281 may store at least one of an inspection command signal for a lighting device 210 of the vehicle 20, an inspection command signal for tires 220, an inspection command signal for an oil leak, an inspection command signal for a caution notification sound (e.g., a horn 230 or a reversing warning sound), or an inspection command signal for a sensor 240. The memory 281 may store a process of inspecting the vehicle 20. For example, the processor 271 may store an inspection target of the vehicle 20 as at least one image in the memory 281 using the camera 241 to inspect the vehicle 20. For example, the processor 271 may store an inspection target of the vehicle 20 as an audio signal in the memory 281 using the microphone 251 to inspect the vehicle 20. The memory 281 may store an inspection record for the vehicle 20.

The communication circuit 231 may transmit and receive information with the vehicle 20 and the control server 30. For example, the communication circuit 231 may support long-range wireless communication (e.g., a cellular network, a world Interoperability for microwave access (WIMAX) network, the Internet, or a WAN) capable of transmitting and receiving information with the control server 30 over the network 199. For example, the communication circuit 231 may support short-range wireless communication (e.g., dedicated short range communication (DSRC), wireless fidelity (Wi-Fi), Wi-Fi Direct, light fidelity (Li-Fi), Bluetooth, Bluetooth low energy (BLE), Zigbee, near field communication (NFC), magnetic secure transmission (MST), radio frequency (RF), or a body area network (BAN)) capable of transmitting and receiving information with the vehicle 20.

The control server 30 may include a communication circuit 233, a processor 273, and/or a memory 283.

The memory 283 may store information about a plurality of air mobility devices including the air mobility device 10 and information about a plurality of vehicles including the vehicle 20. The information about the plurality of air mobility devices may include identification information about each air mobility device (e.g., the air mobility device 10). For example, the identification information about each air mobility device may include an identifier (e.g., a serial number) of each air mobility device (e.g., the air mobility device 10). The information about the vehicle 20 may include position information, identification information, and/or an inspection record of the vehicle 20. For example, the position information and the identification information of the vehicle 20 are described above in conjunction with the memory 281 of the air mobility device 10. For example, the inspection record may include an inspection record for the vehicle 20, which is received from the air mobility device 10. For example, the inspection record may include an inspection record for the vehicle 20, which is received by an external server.

The processor 273 may be connected with the communication circuit 233 and the memory 283. For example, the processor 273 may be electrically connected with the components of the control server 30. For example, the processor 273 may be connected with the components of the control server 30 in a wired or wireless manner. The processor 273 may be composed of a single chip or a plurality of chips. The processor 273 may include at least one processing circuitry. The processor 273 may perform calculation necessary for an operation of the control server 30. The processor 273 may control the components of the control server 30. In the present disclosure, the operation of the control server 30 may be referred to as being performed by the processor 273.

According to an embodiment, the processor 273 may receive an inspection request signal for the vehicle 20 from the vehicle 20 using the communication circuit 233. When receiving the inspection request signal of the vehicle 20 from the vehicle 20, the processor 273 may transmit information of the vehicle 20 to the air mobility device 10 using the communication circuit 233. For example, the processor 273 may transmit position information and/or identification information of the vehicle 20 to the air mobility device 10. When receiving the inspection request signal of the vehicle 20 from the vehicle 20, the processor 273 may transmit a command to inspect the vehicle 20 to the air mobility device 10 using the communication circuit 233. The processor 273 may receive an inspection record for the vehicle 20 from the air mobility device 10 using the communication circuit 233. The processor 273 may inspect the vehicle 20 based on the information stored in the memory 283. For example, the processor 273 may compare a previous inspection record of the vehicle 20, which is stored in the memory 283, with a current inspection record of the vehicle 20, which is received from the air mobility device 10.

The vehicle 20 may include a communication circuit 232, a camera 242, a lighting device 210, tires 220, a horn 230, a sensor 240, a driving device 262, a processor 272, and/or a memory 282. The sensor 240 may include at least one of an autonomous driving sensor, a rear sensor, an air flow sensor, an infrared sensor, an air temperature sensor, a barometric pressure sensor, a throttle position sensor, a water temperature sensor, a crank angle sensor, cam angle control, an idle speed control (ISC) motor, an oxygen sensor, an exhaust gas recirculation (EGR) valve, a positive crankcase ventilation (PCV) valve, a purge control solenoid valve (PCSV) valve, an anti-lock braking system (ABS) sensor, a wheel speed sensor, an electronic control unit (ECU), an electronic controlled suspension (ECS), a transmission control unit (TCU), or a hydraulic coupling unit (HCU). For example, the autonomous driving sensor may include at least one of light detection and ranging (LiDAR), a camera sensor, radar, or an ultrasonic sensor.

According to an embodiment, the processor 272 may transmit an inspection request signal for the vehicle 20 to the control server 30 using the communication circuit 232. The processor 272 may connect short-range communication with the air mobility device 10 using the communication circuit 232. The processor 272 may transmit information about the vehicle 20 to the air mobility device 10 using the communication circuit 232. For example, the information about the vehicle 20 may include at least one of tire information or autonomous driving sensor information of the vehicle 20.

The components of the air mobility device 10, the vehicle 20, and the control server 30, which are described above in conjunction with FIG. 2, are illustrative and embodiments of the present disclosure are not limited thereto. For example, at least one of the air mobility device 10, the vehicle 20, or the control server 30 may not include at least some of the components shown in FIG. 2. For example, at least one of the air mobility device 10, the vehicle 20, or the control server 30 may further include a component, which is not shown in FIG. 2.

Figure 3:
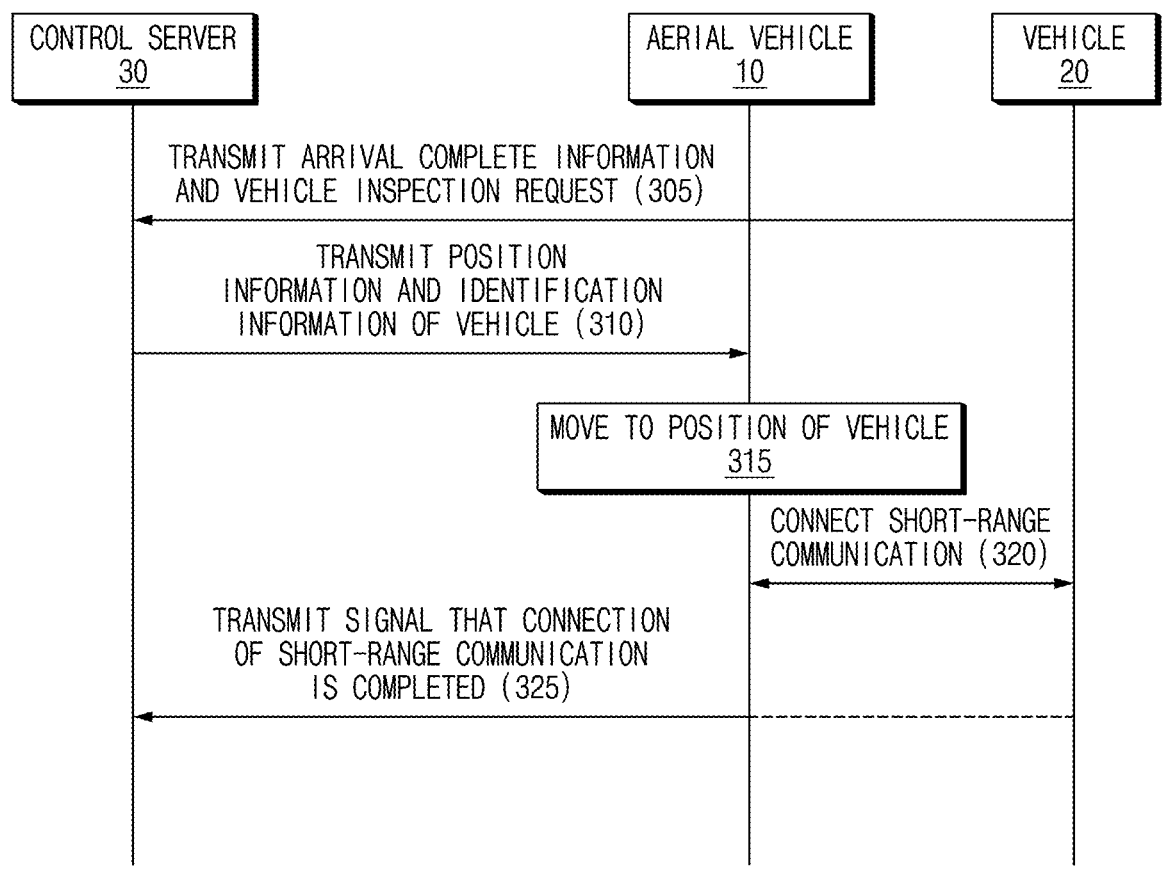
FIG. 3 is a signal sequence diagram for connecting short-range communication between an air mobility device and a vehicle according to an embodiment.

FIG. 3 is a signal sequence diagram for connecting short-range communication between an air mobility device and a vehicle according to an embodiment.

Referring to FIG. 3, in operation 305, a vehicle 20 may transmit a vehicle inspection request to a control server 30. The vehicle 20 may transmit a signal to the control server 30 over, for example, the network 199 described above in conjunction with FIG. 1. In an example, the vehicle 20 may receive a signal for indicating movement to a specified position from the control server 30. When moving to the specified position, the vehicle 20 may transmit a vehicle inspection request. In an example, the vehicle inspection request may include information indicating that the vehicle 20 arrives at the specified position.

In operation 310, the authentication server 30 may transmit vehicle information to the air mobility device 10. For example, the vehicle information may include position information and identification information of the vehicle 20. For example, the control server 30 may transmit a signal to the air mobility device 10 over the network 199.

In operation 315, the air mobility device 10 may move to a position at which the vehicle 20 is present. In an embodiment, the air mobility device 10 may move to the vehicle 20 using the driving device 261 described above in conjunction with FIG. 2. The air mobility device 10 may use vehicle information to move to the vehicle 20. For example, the air mobility device 10 may use position information of the vehicle 20. The air mobility device 10 may identify the vehicle 20 by means of the camera 241 described above in conjunction with FIG. 2 based on the identification information of the vehicle 20, which is described above in conjunction with FIG. 2. For example, the vehicle 20 may obtain at least one image of the vehicle 20 by means of the camera 241 and may determine whether the obtained image is identical to the identification information of the vehicle 20. For example, the vehicle 20 may recognize an image based on machine learning and may identify the vehicle 20. For example, the vehicle 20 may obtain an image of a license plate of the vehicle 20 by means of the camera 241 and may compare the obtained image with a vehicle number based on the identification information of the vehicle 20 to identify the vehicle.

In operation 320, the air mobility device 10 may connect short-range communication with the vehicle 20. The short-range communication may include at least one of, for example, dedicated short range communication (DSRC), wireless fidelity (Wi-Fi), Wi-Fi Direct, light fidelity (Li-Fi), Bluetooth, Bluetooth low energy (BLE), Zigbee, near field communication (NFC), magnetic secure transmission (MST), radio frequency (RF), or a body area network (BAN). In an embodiment, the air mobility device 10 may transmit a request signal for short-range communication to the vehicle 20. When receiving a response signal from the vehicle 20 in response to the request signal for short-range communication, the air mobility device 10 may connect short-range communication with the vehicle 20.

In operation 325, the air mobility device 10 and/or the vehicle 20 may transmit a signal that the connection of the short-range communication is completed to the control server 30. For example, the air mobility device 10 and/or the vehicle 20 may transmit a signal to the control server 30 over the network 199. When receiving the signal including information indicating that the connection of the short-range communication is completed, the control server 30 may transmit a signal indicating inspection of the vehicle 20 by means of the air mobility device 10 to the air mobility device 10. The inspection capable of being performed by the air mobility device 10 is described below in conjunction with FIGS. 4A, 4B, and 4C.

Figure 4A:
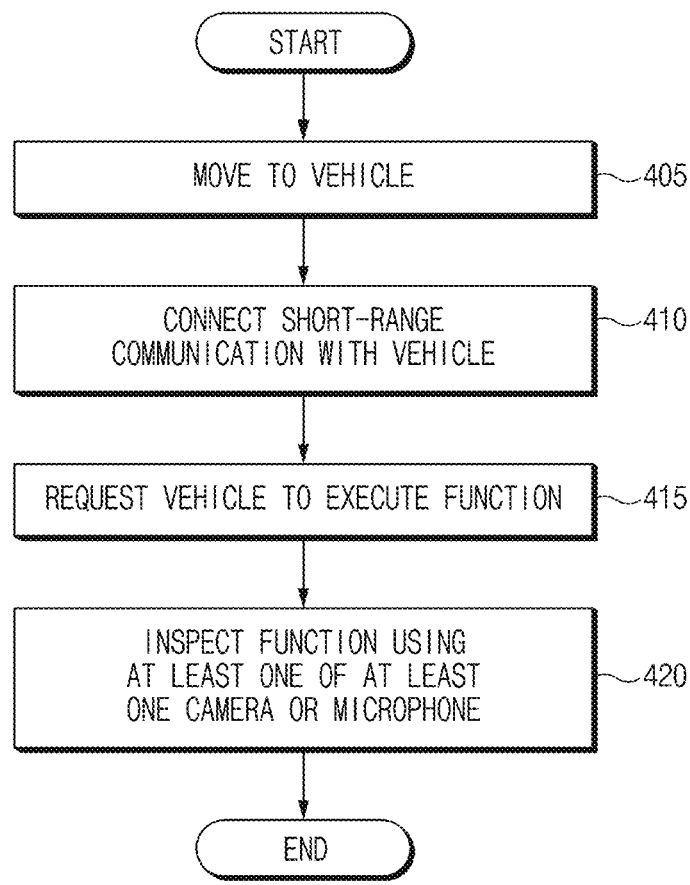
FIG. 4A is a flowchart of a method for inspecting a vehicle in an air mobility device according to an embodiment.

FIG. 4A is a flowchart of a method for inspecting a vehicle in an air mobility device according to an embodiment.

Referring to FIGS. 2, 3, and 4A, in operation 405, an air mobility device 10 may move to a position at which the vehicle 20 is present, using a driving device 261. In an embodiment, the air mobility device 10 may use vehicle information to move to the vehicle 20. For example, the method where the air mobility device 10 moves to the vehicle 20 is described above in operation 315.

In operation 410, the air mobility device 10 may connect short-range communication with the vehicle 20. For example, the method where the air mobility device 10 connects the short-range communication with the vehicle 20 is described above in operation 320.

In operation 415, the air mobility device 10 may transmit a signal for requesting the vehicle 20 to execute a function to the vehicle 20 using the short-range communication. In an embodiment, the function may include at least one of an operation for a lighting device 210 or an operation for a caution notification sound. For example, the lighting device 210 may include at least one of brake lamps, reversing lamps, tail lamps, turn signals, emergency flashers, fog lamps, or headlamps. For example, the caution notification sound may include at least one of a horn sound or a reversing warning sound.

In operation 420, the air mobility device 10 may inspect the function of the vehicle 20 using at least one of a camera 241 or a microphone 251. In an embodiment, the air mobility device 10 may inspect the lighting device 210 using the camera 241. For example, the air mobility device 10 may obtain the lighting device 210 as at least one image using the camera 241. The air mobility device 10 may receive information about at least one image of the normal lighting device 210 from the control server 30 or the vehicle 20. The processor 271 may compare and/or analyze the obtained at least one image with the received at least one image of the normal lighting device 210 to inspect the lighting device 210. Furthermore, the processor 271 may inspect the lighting device 210 by analyzing the obtained at least one image by means of machine learning. In an embodiment, the air mobility device 10 may inspect the caution notification sound using a microphone 251. For example, the air mobility device 10 may obtain the caution notification sound as an audio signal using the microphone 251. The air mobility device 10 may receive information about an audio signal of a normal caution notification sound from the control server 30 or the vehicle 20. The processor 271 may compare and/or analyze the obtained audio signal with the received audio signal of the normal caution notification sound to inspect the caution notification sound. Furthermore, the processor 271 may inspect the caution notification sound by analyzing the obtained audio signal by means of machine learning.

Figure 4B:
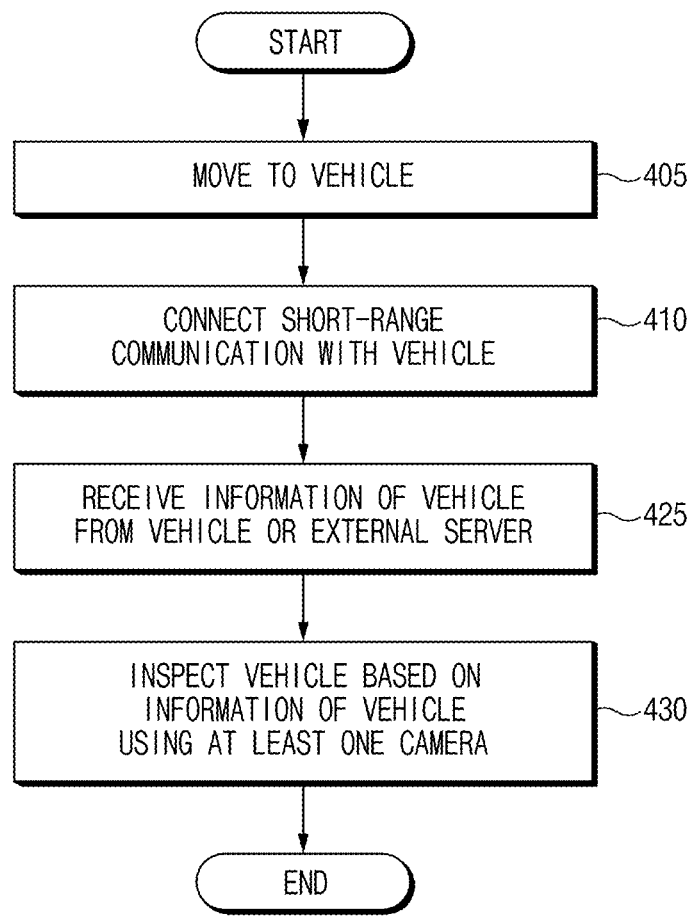
FIG. 4B is a flowchart of a method for inspecting a vehicle in an air mobility device according to another embodiment.

FIG. 4B is a flowchart of a method for inspecting a vehicle in an air mobility device according to another embodiment.

Referring to FIGS. 2 and 4B, operations 405 and 410 of FIG. 4B are the same as operations 405 and 410 described above in conjunction with FIG. 4A.

In operation 425, an air mobility device 10 may receive information of a vehicle 20 from the vehicle 20 and/or the control server 30. In an embodiment, the information of the vehicle 20 may include at least one of information about tires 220 of the vehicle 20 or information about a sensor 240 of the vehicle 20. For example, the information about the tires 220 may include at least one of the number of the tires 220 of the vehicle 20, positions of the tires 220, ages of the tires 220, or places of production of the tires 220. The information about the sensor 240 may include at least one of types of sensors loaded into the vehicle 20, the number of the sensors, or positions of the sensors.

In operation 430, the air mobility device 10 may perform vehicle inspection based on the information of the vehicle 20 using at least one of a camera 241 or a microphone 251. In an embodiment, the air mobility device 10 may inspect the tires 220 by means of the camera 241 based on tire information. For example, the air mobility device 10 may obtain at least one image of the tires 220 using the camera 241. The air mobility device 10 may receive information about at least one image of a normal tire from the control server 30 or the vehicle 20. The processor 271 may compare and/or analyze the obtained at least one image with the received at least one image of the normal tire. The air mobility device 10 may also determine at least one of whether the tires 220 maintain their original shapes, whether the tires 220 are worn, or whether the tires 220 are nailed. Furthermore, the processor 271 may inspect the tires 220 by analyzing the obtained at least one image by means of machine learning. In an embodiment, the air mobility device 10 may inspect the sensor 240 based on the information of the sensor 240 using the camera 241. For example, the air mobility device 10 may obtain the sensor 240 as at least one image using the camera 241. The air mobility device 10 may receive information about at least one image of the normal sensor 240 from the control server 30 or the vehicle 20. The processor 271 may compare and/or analyze the obtained at least one image with the received at least one image of the normal sensor 240 to inspect the sensor 240. Furthermore, the processor 271 may inspect the sensor 240 by analyzing the obtained at least one image by means of machine learning.

Figure 4C:
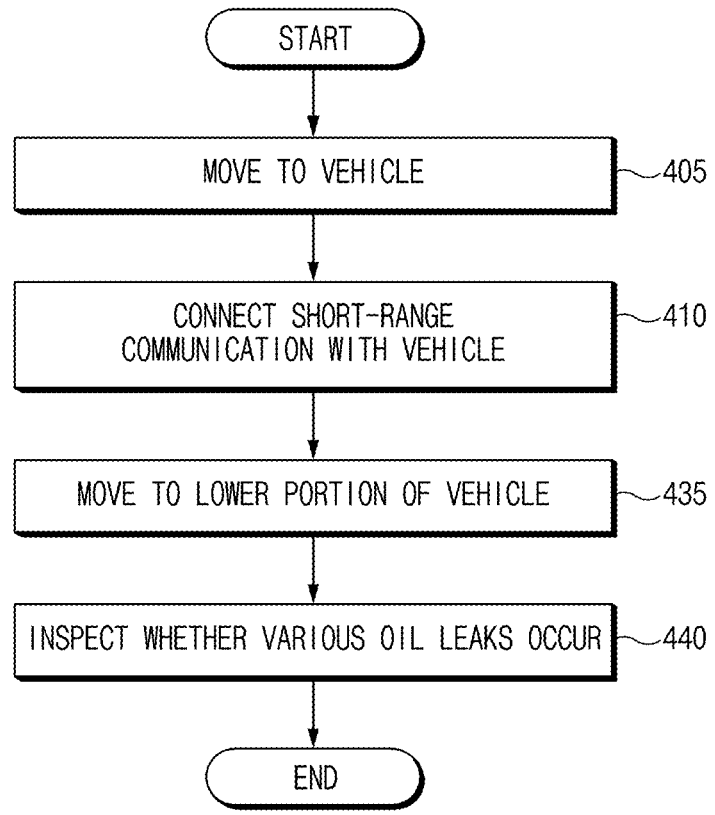
FIG. 4C is a flowchart of a method for inspecting a vehicle in an air mobility device according to another embodiment.

FIG. 4C is a flowchart of a method for inspecting a vehicle in an air mobility device according to another embodiment.

Referring to FIGS. 2 and 4C, operations 405 and 410 of FIG. 4C are the same as operations 405 and 410 described above in conjunction with FIG. 4A.

In operation 435, an air mobility device 10 may move to a lower portion of a vehicle 20. In an embodiment, the air mobility device 10 may identify a lower portion of the vehicle 20 using a camera 241. The air mobility device 10 may move to the identified lower portion of the vehicle 20 using a driving device 261.

In operation 440, the air mobility device 10 may perform inspection for an oil leak of the vehicle 20. For example, the inspection for the oil leak of the vehicle 20 may include inspection for at least one of an engine oil leak, an automatic transmission oil leak, or a brake fluid leak, or a coolant (or antifreeze) leak. In an embodiment, the air mobility device 10 may inspect an oil leak at the lower portion of the vehicle 20 using the camera 241. For example, the air mobility device 10 may obtain the lower portion of the vehicle 20 as at least one image using the camera 241. The air mobility device 10 may receive information about at least one image of the normal lower portion of the vehicle 20 from the control server 30 or the vehicle 20. The processor 271 may compare and/or analyze the obtained at least one image with the received at least one image of the normal lower portion of the vehicle 20 to inspect the oil leak. Furthermore, the processor 271 may inspect the oil leak of the vehicle 20 by analyzing the obtained at least one image by means of machine learning. When it is determined that an oil is leaked by inspecting the oil leak, in operation 440, the air mobility device 10 may perform the above-mentioned inspection of the oil leak once more.

FIGS. 5-9, which is described below, are signal sequence diagrams indicating a detailed method for inspecting a vehicle in an air mobility device according to various embodiments.

Figure 5:
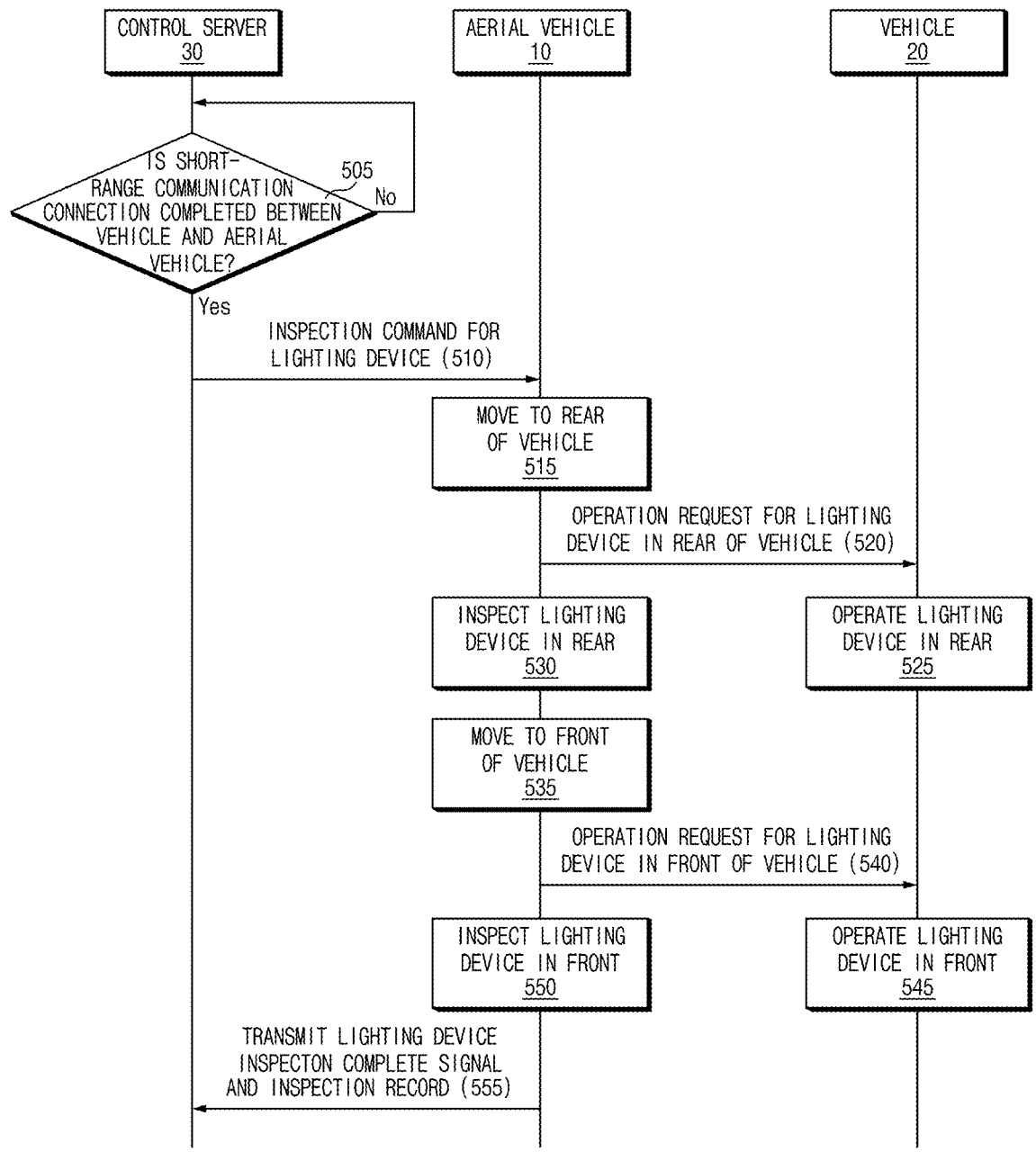
FIG. 5 is a signal sequence diagram illustrating a detailed method for inspecting a lighting device of a vehicle in an air mobility device according to an embodiment.

FIG. 5 is a signal sequence diagram illustrating a detailed method for inspecting a lighting device of a vehicle in an air mobility device according to an embodiment.

Referring to FIGS. 2-5, in operation 505, a control server 30 may determine whether a short-range communication connection is completed between an air mobility device 10 and a vehicle 20. In an embodiment, when receiving a signal including information indicating that the short-range communication connection is completed over the network 199 described above in conjunction with FIG. 1 from the air mobility device 10 or the vehicle 20, the control server 30 may determine that the short-range communication connection is completed between the air mobility device 10 and the vehicle 20. For example, the short-range communication is described above in conjunction with FIG. 3. When the short-range communication connection is not completed between the air mobility device 10 and the vehicle 20 (operation 505—No), the control server 30 may transmit a signal for instructing to connect short-range communication between the air mobility device 10 and the vehicle 20 to the air mobility device 10 and/or the vehicle 20.

When the short-range communication connection is completed between the air mobility device 10 and the vehicle 20 (operation 505—Yes), in operation 510, the control server 30 may transmit an inspection command signal for a lighting device 210 to the air mobility device 10. For example, the lighting device 210 may include at least one of brake lamps, reversing lamps, tail lamps, turn signals, emergency flashers, fog lamps, or headlamps of the vehicle 20.

In operation 515, the air mobility device 10 may move to the rear of the vehicle 20 to inspect the lighting device 210 located in the rear of the vehicle 20. In an embodiment, the air mobility device 10 may identify the rear of the vehicle 20 using the camera 241 and may move to the identified rear using a driving device 261.

In operation 520, the air mobility device 10 may transmit an operation request signal for the lighting device 210 located in the rear of the vehicle 20 to the vehicle 20 using short-range communication. For example, the lighting device 210 in the rear may include at least one of brake lamps, reversing lamps, tail lamps, turn signals, emergency flashers, or fog lamps.

In operation 525, the vehicle 20 may operate the lighting device 210 located in the rear. According to an embodiment, the vehicle 20 may operate a brake function to execute an operation of the brake lamps. The vehicle 20 may operate a reversing function to execute an operation of the reversing lamps. The vehicle 20 may operate at least one of the tail lamps, the turn signals, the emergency flashers, or the fog lamps.

In operation 530, the air mobility device 10 may inspect the lighting device 210 located in the rear of the vehicle 20. For example, the method for inspecting the lighting device 210 located in the rear may include the method for inspecting the lighting device, which is described above in conjunction with FIG. 4A.

In operation 535, the air mobility device 10 may move to the front of the vehicle 20 to inspect the lighting device 210 located in the front of the vehicle 20. In an embodiment, the air mobility device 10 may identify the front of the vehicle 20 using the camera 241 and may move to the identified front using the driving device 261.

In operation 540, the air mobility device 10 may transmit an operation request signal for the lighting device 210 located in the front of the vehicle 20 to the vehicle 20 using short-range communication. For example, the lighting device 210 located in the front may include at least one of tail lamps, turn signals, emergency flashers, fog lamps, or headlamps.

In operation 545, the vehicle 20 may operate the lighting device 210 located in the front. According to an embodiment, the vehicle 20 may operate at least one of the tail lamps, the turn signals, the emergency flashers, the fog lamps, or the headlamps.

In operation 550, the air mobility device 10 may inspect the lighting device 210 located in the front of the vehicle 20. For example, the method for inspecting the lighting device 210 located in the front may include the method for inspecting the lighting device, which is described above in conjunction with FIG. 4A.

In operation 555, the air mobility device 10 may transmit a signal indicating that the inspection of the lighting device 210 is completed to the control server 30. For example, the air mobility device 10 may transmit a signal including at least one of inspection complete information or an inspection record for the lighting device 210 to the control server 30.

Figure 6:
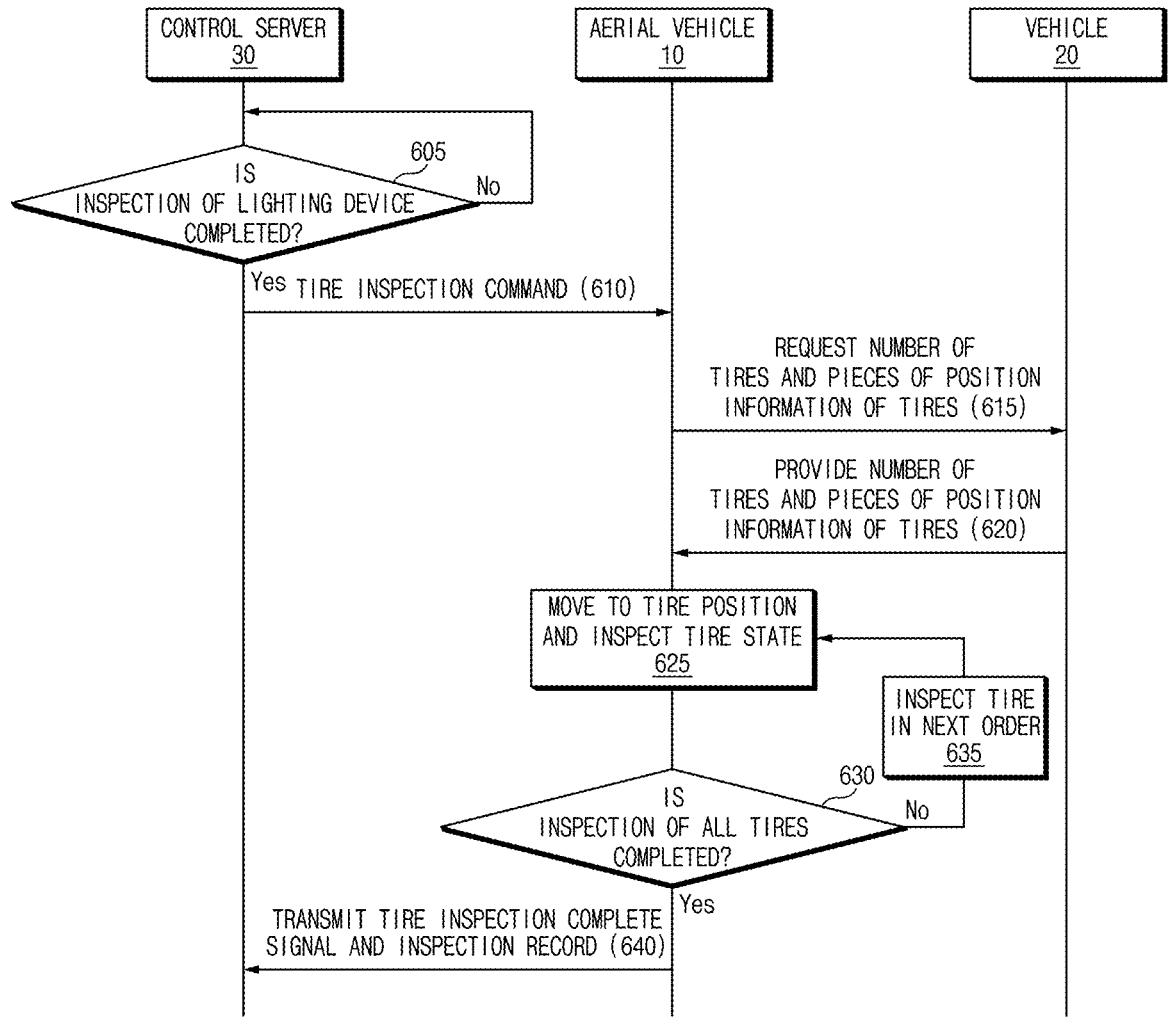
FIG. 6 is a signal sequence diagram illustrating a detailed method for inspecting tires of a vehicle in an air mobility device according to an embodiment.

FIG. 6 is a signal sequence diagram illustrating a detailed method for inspecting tires of a vehicle in an air mobility device according to an embodiment.

Referring to FIGS. 2-6, in operation 605, a control server 30 may determine whether an air mobility device 10 completes inspection of a lighting device 210. In an embodiment, the air mobility device 10 may transmit (e.g., operation 555) a signal that the inspection of the lighting device 210 is completed to the control server 30 over the network 199 described above in conjunction with FIG. 1. When receiving the signal indicating that the inspection of the lighting device 210 is completed, the control server 30 may determine whether the air mobility device 10 completes the inspection of the lighting device 210. When the inspection of the lighting device 210 is not completed (e.g., operation 605—No), the control server 30 may transmit a signal instructing to complete the inspection of the lighting device 210 of a vehicle 20. For example, the control server 30 may determine whether to complete the inspection of the lighting device 210 again through operation 605, which is described above, based on the transmission of the signal instructing to complete the inspection of the lighting device 210.

When the inspection of the lighting device 210 is completed (e.g., operation 605—Yes), in operation 610, the control server 30 may transmit an inspection command signal for tires 220 to the air mobility device 10. For example, the inspection of the tires 220 may include inspection of at least one of air pressure of each of the tires 220, a strain rate of each of the tires 220, a wear level of each of the tires 220, or whether a sharp thing is embedded in each of the tires 220.

In operation 615, the air mobility device 10 may transmit a request signal for requesting tire information from the vehicle 20 using short-range communication. According to an embodiment, the tire information may include at least one of the number of tires 220 of the vehicle 20 or pieces of position information of the tires 220.

In operation 620, the vehicle 20 may transmit its tire information to the air mobility device 10. In an embodiment, the vehicle 20 may receive a request signal for requesting tire information from the air mobility device 10 through short-range communication. The vehicle 20 may determine whether the air mobility device 10, which transmits the request signal, is the air mobility device 10, which receives an inspection command based on its inspection request signal (e.g., operation 305) from the control server 30. For example, the vehicle 20 may include unique number information to the inspection request signal (e.g., operation 305). The vehicle 20 may determine whether the unique number information is included in the tire information request signal transmitted by the air mobility device 10. When the unique number information is included in the tire information request signal transmitted by the air mobility device 10, the vehicle 20 determine the air mobility device 10 as the air mobility device 10, which receives an inspection command, according to the inspection request signal of the vehicle 20 (e.g., operation 305). When the air mobility device 10 is the air mobility device 10, which receives the inspection command according to the inspection request signal of the vehicle 20 (e.g., operation 305), the vehicle 20 may transmit its tire information to the air mobility device 10.

In operation 625, the air mobility device 10 may inspect the tires 220 by means of a camera 241 based on the tire information of the vehicle 20. According to an embodiment, the air mobility device 10 may move to positions of the tires 220 in a set order and may inspect the tires 220. For example, the method for inspecting the tires 220 may include the method for inspecting the tires 220, which is described above in conjunction with FIG. 4B.

In operation 630, the air mobility device 10 may determine whether all the tires 220 are inspected based on tire information. In an embodiment, the air mobility device 10 may determine whether there is a tire which is not inspected or does not have an inspection record based on tire information of the vehicle 20, which is received from the vehicle 20. For example, the air mobility device 10 may distinguish each of the tires 220 based on the number of the tires 220 of the vehicle 20 and pieces of position information of the tires 220. The air mobility device 10 may separately store an inspection record of each of the tires 220 in a memory 281. The tire 220 which does not an inspection record may be determined as the tire 220 which is not inspected or does not have an inspection record.

When the inspection of all the tires 220 is not completed (e.g., operation 630—No), in operation 635, the air mobility device 10 may inspect the tire 220, which is not inspected. For example, the tire 220, which is not inspected, may include the tire 220, which does not have an inspection record. For example, the air mobility device 10 may perform the inspection of the tires 220, which is described above in operation 625, for the tire 220, which is not inspected.

When all the tires 220 are inspected (e.g., operation 630—Yes), in operation 640, the air mobility device 10 may transmit a signal indicating that the inspection of the tires 220 is completed to the control server 30. For example, the air mobility device 10 may transmit a signal including at least one of inspection complete information or an inspection record for the tires 220 to the control server 30.

Figure 7:
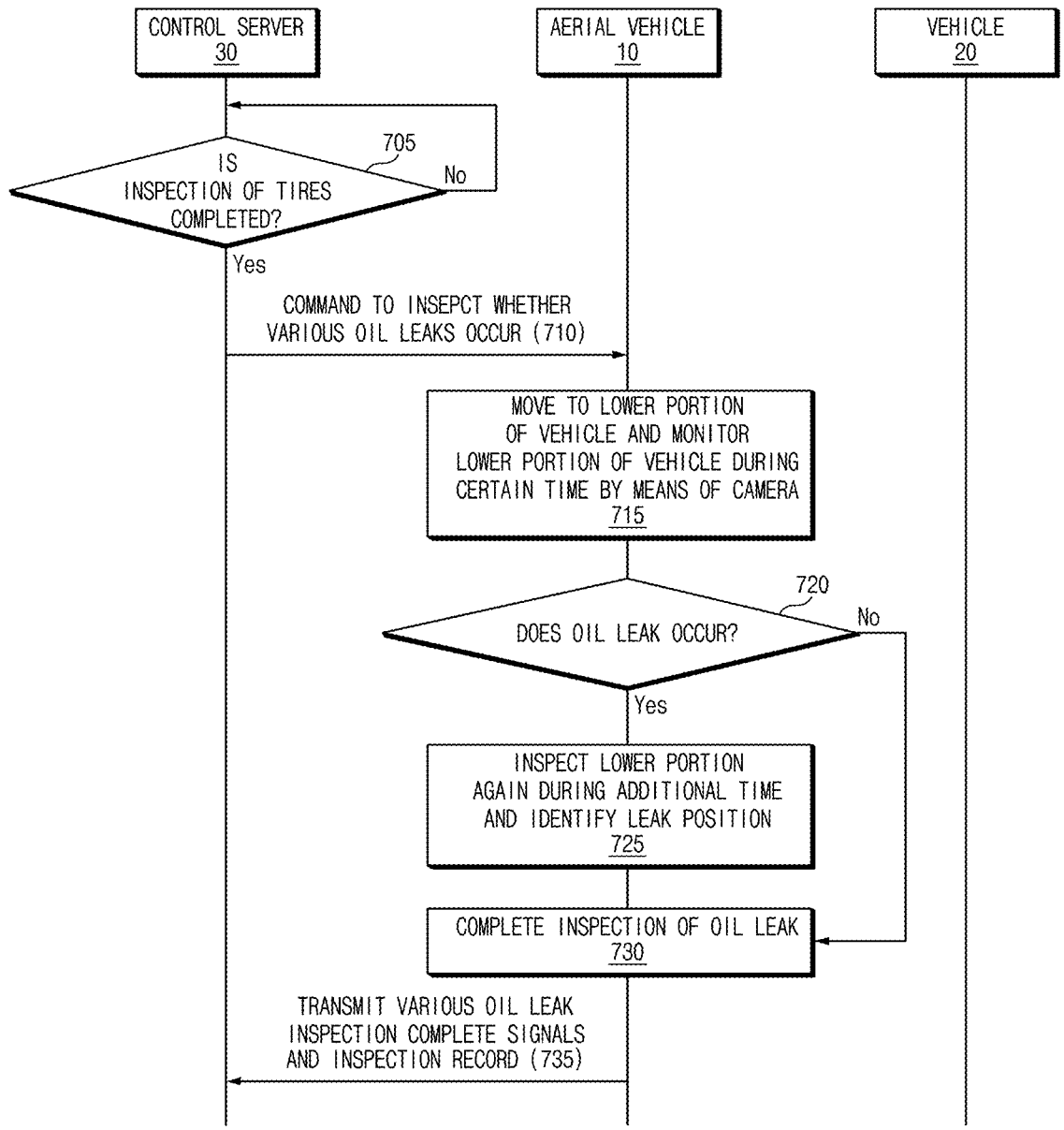
FIG. 7 is a signal sequence diagram illustrating a detailed method for inspecting an oil leak of a vehicle in an air mobility device according to an embodiment.

FIG. 7 is a signal sequence diagram illustrating a detailed method for inspecting an oil leak of a vehicle in an air mobility device according to an embodiment.

Referring to FIGS. 2-7, in operation 705, a control server 30 may determine whether an air mobility device 10 completes inspection of tires 220. In an embodiment, the air mobility device 10 may transmit (e.g., operation 640) a signal that the inspection of the tires 220 is completed to the control server 30 over the network 199 described above in conjunction with FIG. 1. When receiving the signal indicating that the inspection of the tires 220 is completed, the control server 30 may determine whether the air mobility device 10 completes the inspection of the tires 220. When the inspection of the tires 220 is not completed (e.g., operation 705—No), the control server 30 may transmit a signal instructing to complete the inspection of the tires 220 of the vehicle 20 to the air mobility device 10. For example, the control server 30 may determine whether the inspection of the tires 220 is completed again through operation 705 described above, based on the transmission of the signal instructing to complete the inspection of the tires 220.

When the inspection of the tires 220 is completed (e.g., operation 705—Yes), in operation 710, the control server 30 may transmit an inspection command signal for an oil leak to the air mobility device 10. For example, the inspection for the oil leak may include inspection for at least one of an engine oil leak, an automatic transmission oil leak, or a brake fluid leak, or a coolant (or antifreeze) leak.

In operation 715, the air mobility device 10 may move to a lower portion of the vehicle 20. The air mobility device 10 may monitor the lower portion of the vehicle 20 during a certain time. In an embodiment, the air mobility device 10 may identify the lower portion of the vehicle 20 using a camera 241. The air mobility device 10 may move to the identified lower portion of the vehicle 20 using a driving device 261. The air mobility device 10 which moves to the lower portion may monitor the lower portion of the vehicle 20 during a certain time using the camera 241. For example, the air mobility device 10 may obtain the lower portion of the vehicle 20 as at least one image using the camera 241.

In operation 720, the air mobility device 10 may determine whether an oil leak of the vehicle 20 occurs. For example, the method for determining whether the oil leak occurs may include the method for inspecting the oil leak, which is described above in conjunction with FIG. 4C.

When the oil leak of the vehicle 20 occurs (e.g., operation 720—Yes), in operation 725, the air mobility device 10 may inspect a place where the oil leak occurs again at least once. In an embodiment, the air mobility device 10 may identify a position of the place where the oil leak occurs. The method for inspecting the oil leak again may include the method for inspecting the oil leak, which is described above in operations 715 and 720. In an example, inspecting the oil leak again may be omitted.

In operation 730, the air mobility device 10 may determine that the inspection of the oil leak for the vehicle 20 is completed. In an embodiment, when the oil leak of the vehicle 20 does not occur (e.g., operation 720—No), in operation 730, the air mobility device 10 may determine that the inspection of the oil leak is completed. When the oil leak of the vehicle 20 occurs (e.g., operation 720—Yes), in operation 725, the air mobility device 10 may inspect the lower portion again during additional time and identify leak position in operation 725. When the oil leak does not occur after inspecting the oil leak again in operation 725 described above, the air mobility device 10 may determine that the inspection of the oil leak is completed in operation 730. The operations performed according to operation 725 described above are omitted. The air mobility device 10 may also determine that the inspection of the oil leak is completed in operation 730 when the oil leak of the vehicle 20 occurs (e.g., operation 720—Yes) and the air mobility device 10 may inspect the lower portion again during additional time and identify leak position in operation 725.

In operation 735, the air mobility device 10 may transmit a signal indicating that the inspection of the oil leak is completed to the control server 30. For example, the air mobility device 10 may transmit a signal including at least one of inspection complete information or an inspection record for the oil leak to the control server 30.

Figure 8:
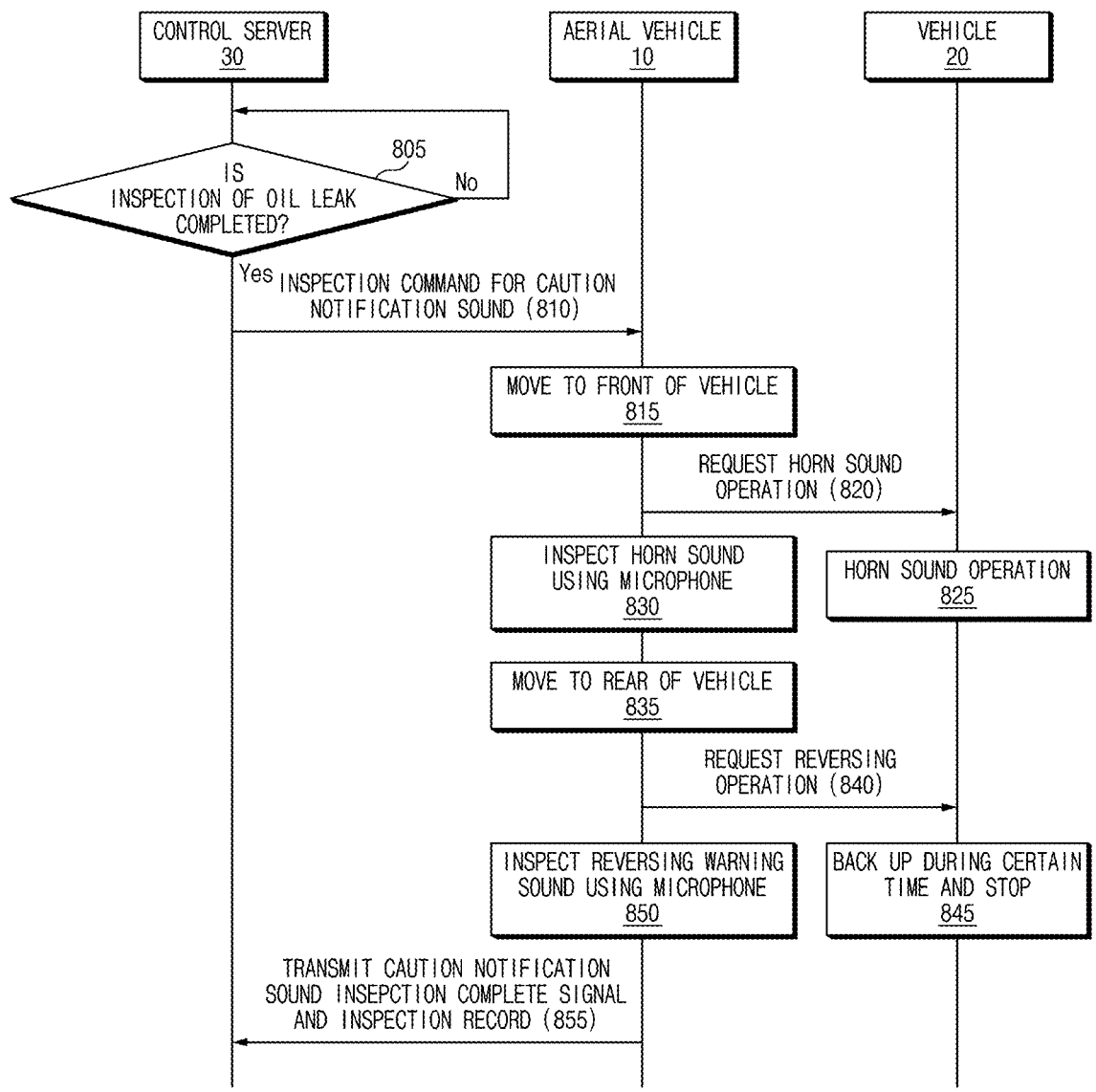
FIG. 8 is a signal sequence diagram illustrating a detailed method for inspecting a caution notification sound of a vehicle in an air mobility device according to an embodiment.

FIG. 8 is a signal sequence diagram illustrating a detailed method for inspecting a caution notification sound of a vehicle in an air mobility device according to an embodiment.

Referring to FIGS. 2-8, in operation 805, a control server 30 may determine whether an air mobility device 10 completes the inspection of an oil leak. In an embodiment, the air mobility device 10 may transmit (e.g., operation 735) a signal that the inspection of the oil leak is completed to the control server 30 over the network 199 described above in conjunction with FIG. 1. When receiving the signal indicating that the inspection of the oil leak is completed, the control server 30 may determine whether the air mobility device 10 completes the inspection of the oil leak. When the inspection of the oil leak is not completed (e.g., operation 805—No), the control server 30 may transmit a signal instructing to complete the inspection of an oil leak of the vehicle 20 to the air mobility device 10. For example, the control server 30 may determine whether the inspection of the oil leak is completed again through operation 805 described above, based on the transmission of the signal instructing to complete the inspection of the oil leak.

When the inspection of the oil leak is completed (e.g., operation 805—Yes), in operation 810, the control server 30 may transmit an inspection command signal for a caution notification sound to the air mobility device 10. For example, the caution notification sound may include at least one of a horn sound or a reversing warning sound.

In operation 815, the air mobility device 10 may move to the front of the vehicle 20 to inspect the horn sound of the vehicle 20. In an embodiment, the air mobility device 10 may identify the front of the vehicle 20 using a camera 241 and may move to the identified front using a driving device 261. In an example, operations performed according to operation 815 described above may be omitted.

In operation 820, the air mobility device 10 may transmit a horn sound operation request for honking a horn 230 to the vehicle 20 using short-range communication. For example, the horn sound operation may include honking the horn 230 at least once. For example, the horn sound operation may honk the horn 230 during at least a certain time.

In operation 825, the vehicle 20 may operate a function for the horn 230 such that the horn 230 is honked. For example, the vehicle 20 may honk the horn 230 at least once. For example, the vehicle 20 may honk the horn 230 during at least a certain time.

In operation 830, the air mobility device 10 may inspect a horn sound of the vehicle 20. According to an embodiment, the air mobility device 10 may receive an audio signal for a horn sound using a microphone 251 and may inspect the horn sound using the received audio signal. For example, the method for inspecting the horn sound may include the method for inspecting the caution notification sound, which is described above in conjunction with FIG. 4A.

In operation 835, the air mobility device 10 may move to the rear of the vehicle 20 to inspect the reversing warning sound of the vehicle 20. In an embodiment, the air mobility device 10 may identify the rear of the vehicle 20 using the camera 241 and may move to the identified rear using the driving device 261. In an example, operations performed according to operation 835 described above may be omitted.

In operation 840, the air mobility device 10 may request a reversing operation for generating a reversing warning sound from the vehicle 20 using short-range communication. The reversing operation may include an operation of putting the gear in rear and backing up. In an example, the air mobility device 10 may immediately move the rear of the vehicle 20 to generate a reversing warning sound. For example, when the air mobility device 10 moves to the rear of the vehicle 20, a sensor 240 (e.g., a rear sensor) of the vehicle 20 may sense the air mobility device 10. When the sensor 240 (e.g., the rear sensor) of the vehicle 20 senses the air mobility device 10, a reversing warning sound of the vehicle 20 may be generated.

In operation 845, the vehicle 20 may operate a reversing function such that the reversing warning sound is honked. For example, the vehicle 20 may change the gear to rear to back up.

In operation 850, the air mobility device 10 may inspect the reversing warning sound of the vehicle 20. According to an embodiment, the air mobility device 10 may receive an audio signal for a reversing warning sound using a microphone 251 and may inspect the reversing warning sound using the received audio signal. For example, the method for inspecting the reversing warning sound may include the method for inspecting the reversing caution notification sound, which is described above in conjunction with FIG. 4A.

In operation 855, the air mobility device 10 may transmit a signal indicating that the inspection of the caution notification sound is completed to the control server 30. For example, the air mobility device 10 may transmit a signal including at least one of inspection complete information or an inspection record for the caution notification sound to the control server 30.

Figure 9:
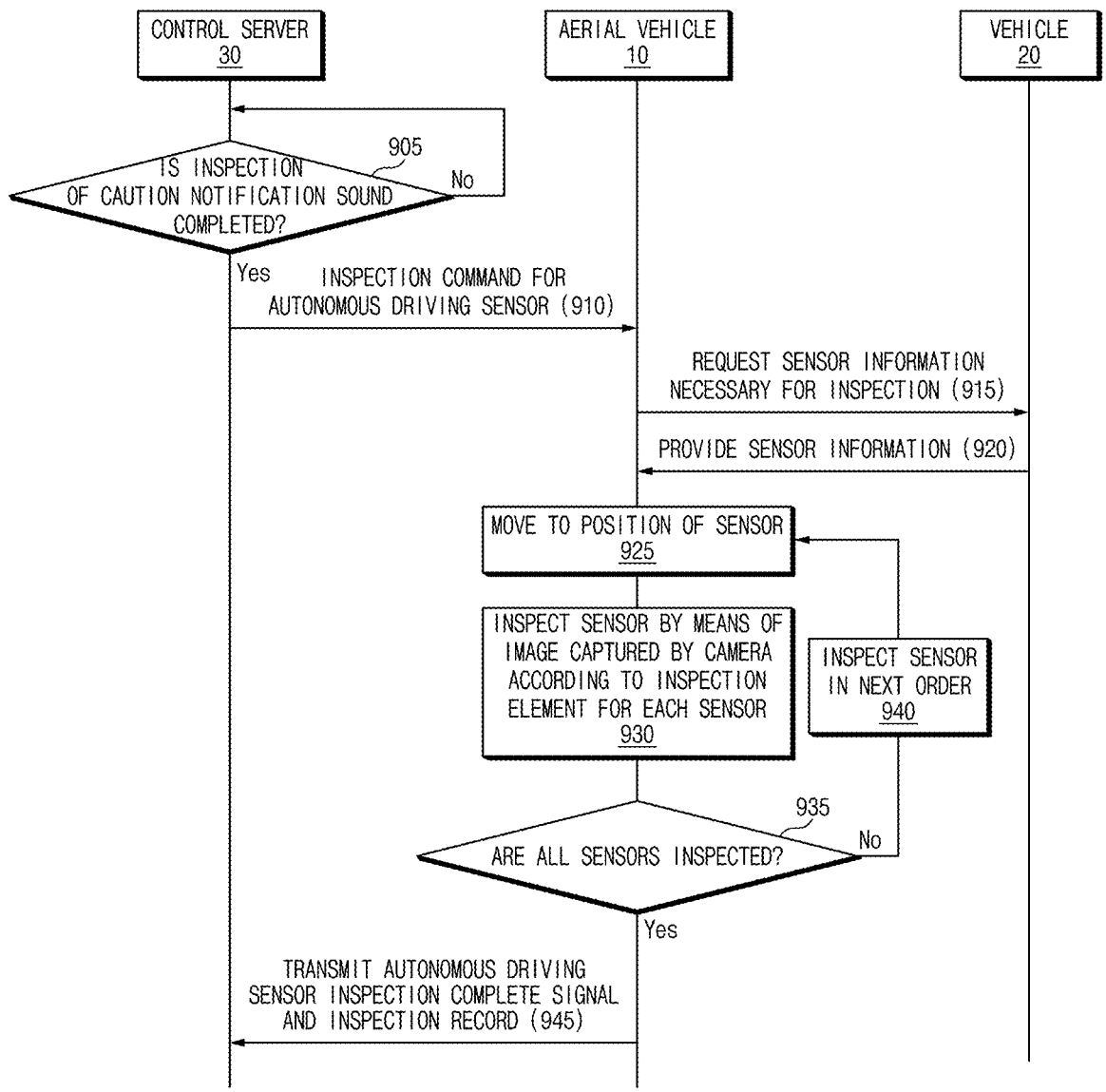
FIG. 9 is a signal sequence diagram illustrating a detailed method for inspecting a sensor of a vehicle in an air mobility device according to an embodiment.

FIG. 9 is a signal sequence diagram illustrating a detailed method for inspecting a sensor of a vehicle in an air mobility device according to an embodiment.

Referring to FIGS. 2-FIG. 9, in operation 905, a control server 30 may determine whether an air mobility device 10 completes the inspection of a caution notification sound. In an embodiment, the air mobility device 10 may transmit (e.g., operation 855) a signal that the inspection of the caution notification sound is completed to the control server 30 over the network 199 described above in conjunction with FIG. 1. When receiving the signal indicating that the inspection of the caution notification sound is completed, the control server 30 may determine whether the air mobility device 10 completes the inspection of the caution notification sound. When the inspection of the caution notification sound is not completed (e.g., operation 905—No), the control server 30 may transmit a signal instructing to complete the inspection of a caution notification sound of the vehicle 20 to the air mobility device 10. For example, the control server 30 may determine whether the inspection of the caution notification sound is completed again through operation 905 described above, based on the transmission of the signal instructing to complete the inspection of the caution notification sound.

When the inspection of the caution notification sound is completed (e.g., operation 905—Yes), in operation 910, the control server 30 may transmit an inspection command signal for a sensor 240 to the air mobility device 10. For example, the sensor 240 may include an autonomous driving sensor. The autonomous driving sensor may include at least one of LiDAR, radar, an ultrasonic sensor, or a camera sensor.

In operation 915, the air mobility device 10 may transmit a request signal of sensor information necessary for inspection of the sensor 240 to the vehicle 20 using short-range communication. In an embodiment, the sensor information may include at least one of a type of the sensor 240 loaded into the vehicle 20, the number of the sensors, or positions of the sensors. For example, the type of the sensor 240 may include at least one of an autonomous driving sensor, an air flow sensor, an infrared sensor, an air temperature sensor, a barometric pressure sensor, a throttle position sensor, a water temperature sensor, a crank angle sensor, cam angle control, an idle speed control (ISC) motor, an oxygen sensor, an exhaust gas recirculation (EGR) valve, a positive crankcase ventilation (PCV) valve, a purge control solenoid valve (PCSV) valve, an anti-lock braking system (ABS) sensor, a wheel speed sensor, an electronic control unit (ECU), an electronic controlled suspension (ECS), a transmission control unit (TCU), or a hydraulic coupling unit (HCU). For example, the autonomous driving sensor may include at least one of LiDAR, a camera sensor, radar, or an ultrasonic sensor.

In operation 920, the vehicle 20 may transmit its sensor information to the air mobility device 10. In an embodiment, the vehicle 20 may receive a request signal for requesting sensor information from the air mobility device 10 through short-range communication. The vehicle 20 may determine whether the air mobility device 10, which transmits the request signal, is the air mobility device 10, which receives an inspection command based on its inspection request signal (e.g., operation 305) from the control server 30. For example, the vehicle 20 may include unique number information in the inspection request signal (e.g., operation 305). The vehicle 20 may determine whether the unique number information is included in the sensor information request signal transmitted by the air mobility device 10. When the unique number information is included in the sensor information request signal transmitted by the air mobility device 10, the vehicle 20 may determine the air mobility device 10 as the air mobility device 10, which receives the inspection command according to the inspection request signal of the vehicle 20 (e.g., operation 305). When the air mobility device 10 is the air mobility device 10 which receives the inspection command according to the inspection request signal of the vehicle 20 (e.g., operation 305), the vehicle 20 may transmit its sensor information to the air mobility device 10.

In operation 925, the air mobility device 10 may move to a position of the sensor 240 based on the sensor information. According to an embodiment, the air mobility device 10 may move to the position where the sensor 240 is present in a set order. The air mobility device 10 may identify the position of the sensor 240 based on the position information of the sensor 240 using a camera 241. The air mobility device 10 may move to the identified position of the sensor 240 using a driving device 241.

In operation 930, the air mobility device 10 may inspect the sensor 240 of the vehicle 20 based on the sensor information. For example, as described above in conjunction with FIG. 4B, the air mobility device 10 may inspect the sensor 240 based on an image of the sensor 240. The air mobility device 10 may receive information necessary for sensor inspection from the vehicle 20 using short-range communication and may inspect the sensor 240. For example, the air mobility device 10 may transmit a signal for requesting the vehicle 20 to travel to the vehicle 20. The air mobility device 10 may approach the periphery of the vehicle 20 or may go backwards from the periphery of the vehicle 20, while the vehicle 20 is traveling. The air mobility device 10 may receive a signal including information about the result where the sensor 240 of the vehicle 20 senses that the air mobility device 10 approaches it or goes backwards from it from the vehicle 20. The air mobility device 10 may inspect the sensor 240 of the vehicle 20 based on the information received from the vehicle 20.

In operation 935, the air mobility device 10 may determine whether the inspection of all the sensors 240 is completed based on the sensor information. In an embodiment, the air mobility device 10 may determine whether there is a sensor which is not inspected or does not have an inspection record based on the sensor information of the vehicle 20, which is received from the vehicle 20. For example, the air mobility device 10 may distinguish each of the sensors 240 and may store an inspection record for each of the sensors 240 in a memory 281, based on information including at least one of types of the sensors 240, the number of the sensors 240, or positions of the sensors 240. The sensor 240 which does not an inspection record may be determined as the sensor 240 which is not inspected or does not have an inspection record.

When the inspection of all the sensors 240 is not completed (e.g., operation 935—No), in operation 940, the air mobility device 10 may inspect the sensor 240, which is not inspected. For example, the sensor 240, which is not inspected, may include the sensor 240, which does not have an inspection record. For example, the air mobility device 10 may perform the sensor inspection, which is described above in operation 930, for the sensor 240, which is not inspected.

When the inspection of all the sensors 240 is completed (e.g., operation 935—Yes), in operation 945, the air mobility device 10 may transmit a signal indicating that the inspection of the sensor 240 is completed to the control server 30. For example, the air mobility device 10 may transmit a signal including at least one of inspection complete information or an inspection record for the sensor 240 to the control server 30.

Figure 10:
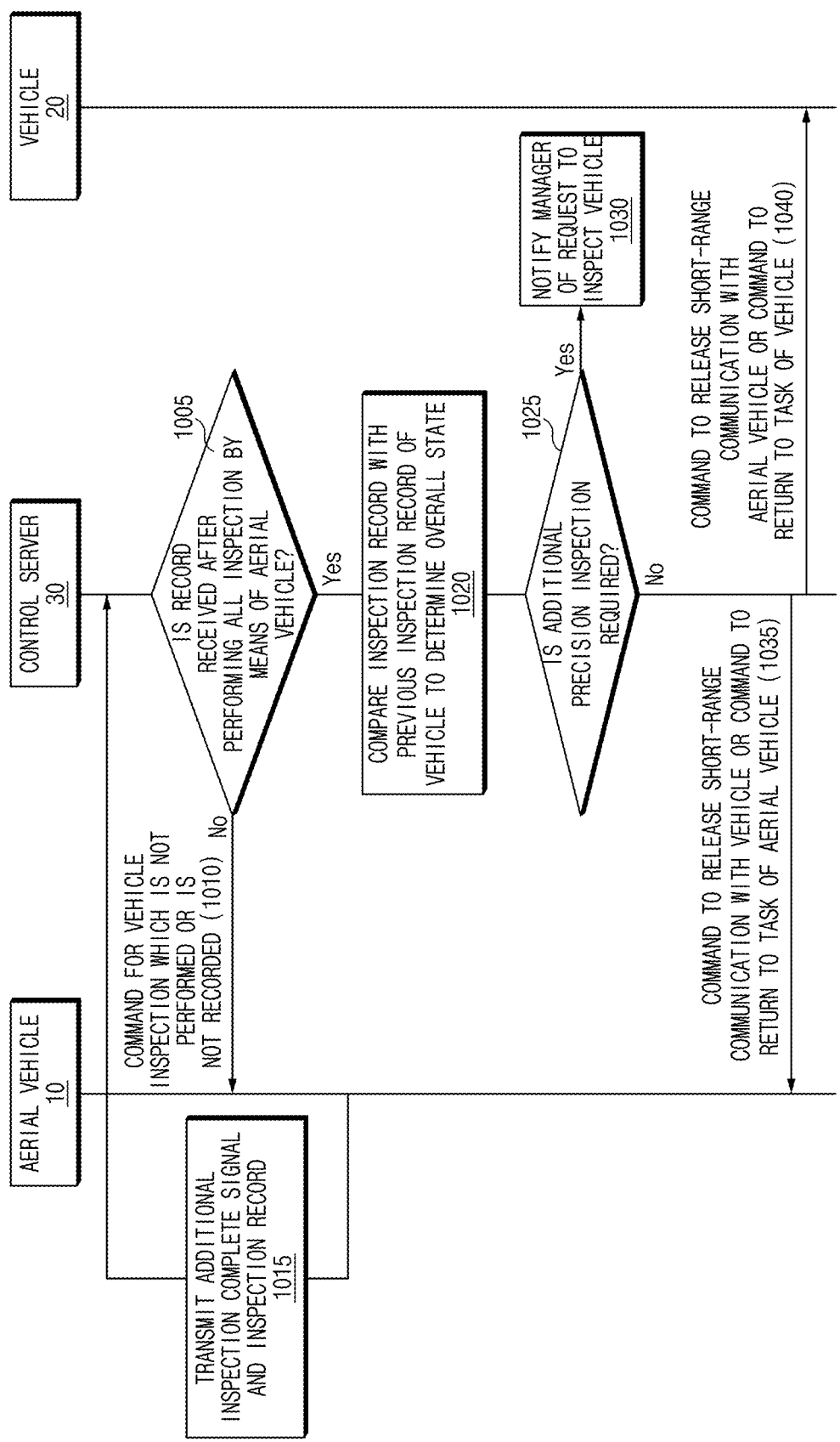
FIG. 10 is a flowchart of a method for inspecting a vehicle in a control server.

FIG. 10 is a flowchart of a method for inspecting a vehicle in a control server.

Referring to FIGS. 2-10, in operation 1005, a control server 30 may determine whether an air mobility device 10 completes all inspection of a vehicle 20. In an embodiment, when receiving all of signals including inspection records for the vehicle 20 over the network 199 described above in conjunction with FIG. 1 from the air mobility device 10, the control server 30 may determine that the air mobility device 10 completes all the inspection of the vehicle 20.

When all the inspection of the vehicle 20 is not completed (e.g., operation 1005—No), in operation 1010, the control server 30 may transmit an inspection command signal for vehicle inspection, which is not performed or is not recorded to the air mobility device 10. According to an embodiment, when a part, the inspection of which is not performed, is identified, the control server 30 may transmit (e.g., operation 510) an inspection command signal for the part, the inspection of which is not performed, to the air mobility device 10. According to an embodiment, when a part, the inspection of which is not recorded, is identified, the control server 30 may transmit a signal instructing to transmit (e.g., operation 555) an inspection record for the part, the inspection of which is not recorded, to the air mobility device 10. For example, the control server 30 may transmit a signal for requesting an inspection record of the vehicle 20, which is stored in a memory 281 of the air mobility device 10.

In operation 1015, the air mobility device 10 may inspect the part, the inspection of which is not performed or is not recorded. According to an embodiment, the air mobility device 10 may inspect the vehicle 20 according to the operation described above in conjunction with FIGS. 5-9 for the vehicle 20, the inspection of which is not performed. The air mobility device 10 may transmit an inspection record stored in the memory 281 of the air mobility device 10, for the non-inspection record, which is not transmitted to the control server 30, to the control server 30.

When all the inspection of the vehicle 20 is completed (e.g., operation 1005—Yes), in operation 1020, the control server 30 may compare a previous inspection record with a current inspection record received from the air mobility device 10 to inspect the vehicle 20. For example, the previous inspection record for the vehicle 20 may include information received from the external server (not shown) described above in conjunction with FIG. 1. The previous inspection record for the vehicle 20 may include at least one of pieces of information stored in a memory 283 of the control server 30.

In operation 1025, the control server 30 may determine whether it is necessary to additionally inspect the vehicle 20. According to an embodiment, the control server 30 may compare the previous inspection record with the current inspection record by means of a processor 273. When a part requiring inspection in the previous inspection record is recorded as requiring inspection in the current inspection record, the control server 30 may determine that additional inspection is required.

When the additional inspection of the vehicle 20 is required (operation 1025—Yes), in operation 1030, the control server 30 may transmit a notification message for notifying a manager of a request to inspect the vehicle 20 to the manager.

When the additional inspection for the vehicle 20 is not required (operation 1025—No), in operation 1035, the control server 30 may transmit a signal including at least one of a command to release short-range communication with the vehicle 20 or a command to return to a task of the air mobility device 10 to the air mobility device 10. For example, returning to the task may include returning to a place where the air mobility device 10 previously waits.

When the additional inspection for the vehicle 20 is not required (operation 1025—No), in operation 1040, the control server 30 may transmit a signal including at least one of a command to release short-range communication with the air mobility device 10 or a command to return to a task of the vehicle 20 to the vehicle 20. For example, the command to return to the task of the vehicle 20 may include returning to a task performed by the vehicle 20 before requesting the control server 30 to perform inspection.

Figure 11:
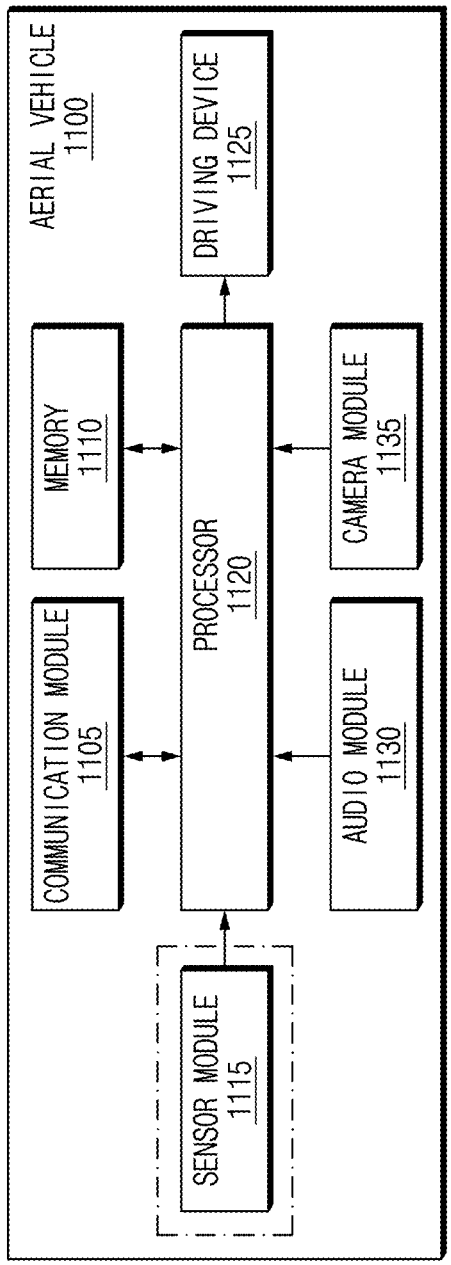
FIG. 11 illustrates a block diagram of an air mobility device according to an embodiment.

FIG. 11 illustrates a block diagram of an air mobility device according to an embodiment.

An air mobility device 1100 may include, for example, all or some of components of an air mobility device 10 shown in FIG. 2. The air mobility device 1100 may include at least one of a communication module 1105, a memory 1110, a sensor module 1115, a processor (e.g., an AP) 1120, a driving device 1125, an audio module 1130, or a camera module 1135.

The processor r 1120 may include, for example, a processor 271 of FIG. 2. The processor 1120 may run an operating system or an application program to control a plurality of hardware or software components connected with the processor 1120 and may perform a variety of data processing and calculation. The processor 1120 may be implemented as, for example, a system on chip (SoC). According to an embodiment, the processor 1120 may further include a graphic processing unit (GPU) and/or an image signal processor. The processor 1120 may include at least some (e.g., the communication module 1105) of the components shown in FIG. 11. The processor 1120 may load a command or data received from at least one of other components (e.g., a non-volatile memory) into a volatile memory to process the command or data and may store result data in the non-volatile memory.

The air mobility device 1100 may have the same or similar configuration to the communication module 1105. The communication module 1105 may include, for example, a communication circuit 231 of FIG. 2. The communication module 1105 may include a cellular module, a Wi-Fi module, a Bluetooth module, a global positioning system (GNSS) module, a near field communication (NFC) module, and an RF module. According to an embodiment, the cellular module may perform at least some of functions capable of being provided by the processor 1120. According to an embodiment, the cellular module may include a communication processor (CP). According to a certain embodiment, at least some (e.g., two or more) of the cellular module, the Wi-Fi module, the Bluetooth module, the GNSS module, or the NFC module may be included in one integrated chip (IC) or one IC package. The RF module may transmit and receive, for example, a communication signal (e.g., an RF signal). The RF module may include, for example, a transceiver, a power amplifier module (PAM), a frequency filter, a low noise amplifier (LNA), an antenna, or the like. According to another embodiment, at least one of the cellular module, the Wi-Fi module, the Bluetooth module, the GNSS module, or the NFC module may transmit and receive an RF signal through a separate RF module.

The memory 1110 may include, for example, a memory 281 of FIG. 2. The memory 1110 may include an internal memory or an external memory. The internal memory may include at least one of, for example, a volatile memory (e.g., a dynamic random access memory (DRAM), a static RAM (SRAM), a synchronous dynamic RAM (SDRAM), and the like), or a non-volatile memory (e.g., a programmable read only memory (PROM), a one-time programmable ROM (OTPROM), an erasable and programmable ROM (EPROM), an electrically erasable and programmable ROM (EEPROM), a mask ROM, a flash ROM, a flash memory, a hard drive, or a solid state drive (SSD)). The external memory may include at least one of a flash drive (e.g., a compact flash), secure digital (SD), micro-SD, mini-SD, extreme digital (xD), a multi-media card (MMC), or a memory stick.

The sensor module 1115 may not be included in, for example, components of an air mobility device 10 of FIG. 2. The sensor module 1115 may measure a physical quantity or may detect an operation state of the air mobility device 1100 and may convert t the measured or detected information to an electrical signal. The sensor module 1115 may further include a control circuit for controlling at least one or more sensors included therein. In an embodiment, the air mobility device 1100 may further include a processor which is a part of the processor 1120 or is independent of the processor 1120 and is configured to control the sensor module 1115. The processor 1120 may control the sensor module 1115 while the processor 1120 remains at a sleep state.

The audio module 1130 may include, for example, a microphone 251 of FIG. 2. The audio module 1130 may convert a sound and an electrical signal in dual directions. The audio module 1130 may process, for example, sound information which is input or output through a speaker, a receiver, an earphone, a microphone, or the like.

The camera module 1135 may include, for example, a camera 241 of FIG. 2. The camera module 1135 may be, for example, a device capable of capturing a still image and a moving image. According to an embodiment, the camera module 1135 may include at least one of one or more image sensors (e.g., a front sensor or a rear sensor), a lens, an image signal processor (ISP), or a flash (e.g., an LED or a xenon lamp).

The driving device 1125 may include, for example, a driving device 261 of FIG. 2. The driving device 1125 may include at least one of a rotor, an electric motor, a gas engine, a jet engine, a turbo prop engine, a rocket engine, an electric engine, a DC motor, a fuel cell, or a solar panel.

The control server according to an embodiment of the present disclosure may control an air mobility device using a network. The control server may inspect at least one of a lighting device, tires, an oil leak, a horn, a reversing warning sound, or a sensor of the vehicle using a controllable air mobility device.

In addition, various effects ascertained directly or indirectly through the present disclosure may be provided.

Hereinabove, although the present disclosure has been described with reference to embodiments and the accompanying drawings, the present disclosure is not limited thereto, but may be variously modified and altered by those having ordinary skill in the art to which the present disclosure pertains without departing from the spirit and scope of the present disclosure claimed in the following claims.

What is claimed is:

1. An air mobility device, comprising:
at least one communication circuit;
at least one camera;
a microphone;
a driving device;
a memory; and
a processor connected with the at least one communication circuit, the at least one camera, the microphone, the driving device, and the memory,
wherein the processor is configured to:
move the air mobility device to a position adjacent to a vehicle using the driving device;
establish a connection for communication with the vehicle using the at least one communication circuit;
receive a first request signal for requesting inspection of the vehicle, wherein the first request signal includes a first unique number;
transmit a second request signal for requesting the vehicle to execute a function to the vehicle through the communication;
transmit a third request signal for requesting information on the vehicle, wherein the third request signal includes a second unique number;
receive the information on the vehicle based on the first unique number and the second unique number being identical; and
inspect the function of the vehicle based on the information on the vehicle.

2. The air mobility device of claim 1, wherein the function includes at least one of an operation for a lighting device or an operation for a caution notification sound.

3. The air mobility device of claim 2, wherein the lighting device includes at least one of brake lamps, reversing lamps, tail lamps, turn signals, emergency flashers, fog lamps, or headlamps of the vehicle, and
wherein the processor is further configured to:
obtain at least one image for the lighting device using the at least one camera; and
inspect the lighting device using the at least one image.

4. The air mobility device of claim 2, wherein the caution notification sound includes at least one of a horn sound or a reversing warning sound of the vehicle, and
wherein the processor is further configured to:
receive at least one audio signal for the caution notification sound by means of the microphone; and
inspect the caution notification sound using the at least one audio signal.

5. The air mobility device of claim 1, wherein the processor is further configured to:
inspect the vehicle based on the information on the vehicle, using the at least one camera.

6. The air mobility device of claim 5, wherein the information on the vehicle includes at least one of tire information of the vehicle or sensor information of the vehicle.

7. The air mobility device of claim 6, wherein the tire information of the vehicle includes at least one of the number of tires of the vehicle, positions of the tires, ages of the tires, or places of production of the tires, and
wherein the processor is further configured to:
obtain at least one image for the tires of the vehicle by means of the at least one camera based on the tire information of the vehicle; and
inspect the tires using the at least one image.

8. The air mobility device of claim 6, wherein the sensor information includes at least one of types of sensors, the number of the sensors, or positions of the sensors, and
wherein the processor is further configured to:
obtain at least one image for the sensor information using the at least one camera; and
inspect the sensors using the at least one image.

9. The air mobility device of claim 1, wherein the processor is further configured to:
move to a lower portion of the vehicle using the driving device;
obtain at least one image of the lower portion using the at least one camera; and
inspect an oil leak of the vehicle using the at least one image.

10. A method for inspecting a vehicle using an air mobility device, the method comprising:
moving the air mobility device to a position adjacent to the vehicle using a driving device of the air mobility device;
establishing a connection for communication with the vehicle;
receiving a first request signal for requesting inspection of a vehicle, wherein the first request signal includes a first unique number;
transmitting a second request signal for requesting the vehicle to execute a function through the communication;
transmit a third request signal for requesting information on the vehicle, wherein the third request signal includes a second unique number;
receive the information on the vehicle based on the first unique number and the second unique number being identical; and
inspecting the function of the vehicle based on the information on the vehicle.

11. The method of claim 10, wherein the function includes at least one of an operation for a lighting device or an operation for a caution notification sound.

12. The method of claim 11, further comprising:
obtaining at least one image for the lighting device using the at least one camera; and
inspecting the lighting device using the at least one image,
wherein the lighting device includes at least one of brake lamps, reversing lamps, tail lamps, turn signals, emergency flashers, fog lamps, or headlamps of the vehicle.

13. The method of claim 11, further comprising:
receiving at least one audio signal for the caution notification sound by means of the microphone; and
inspecting the caution notification sound using the at least one audio signal,
wherein the caution notification sound includes at least one of a horn sound or a reversing warning sound of the vehicle.

14. The method of claim 10, further comprising:
inspecting the vehicle based on the information on the vehicle, using the at least one camera.

15. The method of claim 14, wherein the information on the vehicle includes at least one of tire information of the vehicle or sensor information of the vehicle.

16. The method of claim 15, further comprising:
obtaining at least one image for tires of the vehicle by means of the at least one camera based on the tire information of the vehicle; and
inspecting the tires based on the at least one image,
wherein the tire information of the vehicle includes at least one of the number of the tires of the vehicle, positions of the tires, ages of the tires, or places of production of the tires.

17. The method of claim 15, further comprising:
obtaining at least one image for the sensor information using the at least one camera; and
inspecting sensors included in the vehicle using the at least one image,
wherein the sensor information includes at least one of types of the sensors, the number of the sensors, or positions of the sensors.

18. The method of claim 10, further comprising:
moving to a lower portion of the vehicle using the driving device;
obtaining at least one image of the lower portion using the at least one camera; and
inspecting an oil leak of the vehicle using the at least one image.

19. A vehicle inspection system, comprising:
a control server,
wherein the control server is configured to:
establish a wireless communication connection with an air mobility device and a vehicle;
move the air mobility device to a position adjacent to the vehicle using a driving device included in the air mobility device through the wireless communication;
establish a short-range communication connection between the air mobility device and the vehicle;
transmit an inspection command to the air mobility device, such that the air mobility device transmits a request signal for requesting the vehicle to execute a function to the vehicle;
receive a result of inspection of the vehicle from the air mobility device; and
inspect the vehicle based on the result of inspection and a result of previous inspection of the vehicle,
wherein the inspection is performed based on the information on the vehicle and a first unique number and a second unique number being identical,
wherein the first unique number is transmitted from the vehicle to the air mobility device, and wherein the second unique number is transmitted from the air mobility device to the vehicle.

\* \* \* \* \*